(12) United States Patent
Nakamura

(10) Patent No.: US 12,113,861 B2
(45) Date of Patent: Oct. 8, 2024

(54) MEASUREMENT SYSTEM, TERMINAL, MEASUREMENT INSTRUMENT, AND STORAGE MEDIUM

(71) Applicant: HIOKI E.E. CORPORATION, Ueda (JP)

(72) Inventor: Tetsuya Nakamura, Ueda (JP)

(73) Assignee: HIOKI E.E. CORPORATION, Ueda (JP)

( * ) Notice: Subject to any disclaimer, the term of this patent is extended or adjusted under 35 U.S.C. 154(b) by 4 days.

(21) Appl. No.: 17/535,199

(22) Filed: Nov. 24, 2021

(65) Prior Publication Data

US 2022/0166836 A1 May 26, 2022

(30) Foreign Application Priority Data

Nov. 26, 2020 (JP) ................. 2020-195989
Nov. 26, 2020 (JP) ................. 2020-195993

(51) Int. Cl.
  *H04L 67/12* (2022.01)
  *H04L 67/1095* (2022.01)
(52) U.S. Cl.
  CPC .......... *H04L 67/12* (2013.01); *H04L 67/1095* (2013.01)
(58) Field of Classification Search
  None
  See application file for complete search history.

(56) References Cited

U.S. PATENT DOCUMENTS 10,318,441 B2 * 6/2019 Inoue ................. G01N 33/0037
10,393,815 B2   8/2019 Cheek
2015/0218872 A1 * 8/2015 Breed ................. F02N 11/0807
                                                                701/2

(Continued)

FOREIGN PATENT DOCUMENTS

JP  2011242225 A  12/2011
JP  2014195386 A  10/2014

(Continued)

OTHER PUBLICATIONS

Cambra et al., "Low cost wireless sensor network for rodents detection", Sep. 1, 2017, IEEE, 2017 10th IFIP Wireless and Mobile Networking Conference (WMNC) (pp. 1-7) (Year: 2017).*

(Continued)

*Primary Examiner* — Davoud A Zand
(74) *Attorney, Agent, or Firm* — Jordan IP Law, LLC

(57) ABSTRACT

Provided is a measurement system in which a measurement instrument and a terminal are configured so as to be communicatable. The measurement instrument is provided with: a measurement unit configured to execute measurement processing for measuring a physical quantity of a measurement target; a detection unit configured to detect execution of the measurement processing; and a transmission permission unit configured to permit transmission of a measurement result to the terminal, the permission being triggered by detection of the execution of the measurement processing by the detection unit. The terminal is provided with: a result reception unit configured to receive the measurement result from the measurement instrument; and an execution unit configured to execute a predetermined processing based on the measurement result received.

19 Claims, 17 Drawing Sheets

(56) References Cited

U.S. PATENT DOCUMENTS

| | | | | |
|---|---|---|---|---|
| 2018/0176748 A1* | 6/2018 | Kim | ................... | H04L 67/34 |
| 2019/0271681 A1* | 9/2019 | McKirdy | ............ | G06K 19/0723 |
| 2020/0178129 A1* | 6/2020 | Siomina | ............ | H04W 36/0058 |
| 2021/0173020 A1* | 6/2021 | Darrah | .................... | G01P 15/14 |
| 2021/0176318 A1* | 6/2021 | Darrah | .............. | H04W 52/0235 |

FOREIGN PATENT DOCUMENTS

| | | | |
|---|---|---|---|
| JP | 2016166761 A | 9/2016 | |
| JP | 2018036284 A | 3/2018 | |
| WO | 2018230256 A1 | 5/2020 | |

OTHER PUBLICATIONS

Murugesh et al., "Designing a Wireless Solar Power Monitor for Wireless Sensor Network Applications", Dec. 1, 2018, IEEE, 2018 IEEE 8th International Advance Computing Conference (IACC) (2018, pp. 79-84) (Year: 2018).*

* cited by examiner

HIOKI 1F UPS ROOM
UPS1-1,No.1
1.000mΩ,12.00V
PASS

MEASUREMENT SYSTEM, TERMINAL, MEASUREMENT INSTRUMENT, AND STORAGE MEDIUM

CROSS-REFERENCE TO RELATED APPLICATION

The present application claims priority under 35 U.S.C. § 119 to Japanese Patent Application 2020-195989 (filed Nov. 26, 2020) and Japanese Patent Application 2020-195993 (filed on Nov. 26, 2020), which are hereby incorporated by reference in their entirety.

TECHNICAL FIELD

The present invention relates to a measurement system, a terminal, a measurement instrument, and a storage medium.

BACKGROUND ART

U.S. Ser. No. 10/393,815B discloses a tester. This tester has a function of displaying a measurement result on a display unit and a function of storing a measurement result in a memory.

SUMMARY OF INVENTION

With a measurement apparatus including such a tester, etc., there is a case in which information related to the measurement is required by a terminal separate from the measurement apparatus. In this case, a communication needs to be performed between the measurement apparatus and the terminal.

In general, a procedure of such a communication includes a transmission of a command for requiring the information from the one apparatus to the other apparatus and a transmission of the information to the one apparatus from the other apparatus that has received the command.

However, when such a communication procedure is applied to a measurement system, the measurement apparatus for transmitting the information is required to execute a reception processing for receiving the command all the time. In addition, the measurement apparatus needs to execute a transmission processing of the information every time the command is received.

Therefore, with the measurement apparatus, a load required for the reception processing and the transmission processing is increased, and the measurement processing may be affected.

The present invention has been conceived in light of the problems mentioned above, and an object thereof is to provide a measurement system, a terminal, a measurement instrument, and a storage medium capable of suppressing effects that may be caused on a measurement processing.

According to an aspect of the present invention, a measurement system include a measurement instrument and a terminal, the measurement instrument and the terminal being configured so as to be communicatable, wherein the measurement instrument includes: a measurement unit configured to execute a measurement processing for measuring a physical quantity of a measurement target; a detection unit configured to detect execution of the measurement processing; and a transmission permission unit configured to permit transmission of a measurement result to the terminal, the permission being triggered by detection of the execution of the measurement processing by the detection unit, and the terminal includes: a result reception unit configured to receive the measurement result from the measurement instrument; and an execution unit configured to execute a predetermined processing based on the measurement result received.

In this aspect, with the measurement instrument, the transmission of the measurement result to the terminal is permitted by being triggered by the detection of the execution of the measurement processing.

Therefore, compared with a case in which the measurement instrument needs to stand by to receive a request command from the terminal all the time and needs to transmit the measurement result to the terminal every time it receives the request command, it is possible to suppress the reception processing and the transmission processing that may be caused during the measurement processing.

Therefore, it is possible to suppress the effect that may be caused on the measurement processing.

DESCRIPTION OF EMBODIMENTS

A first embodiment of the present invention will be described below with reference to the attached drawings.

Figure 1:
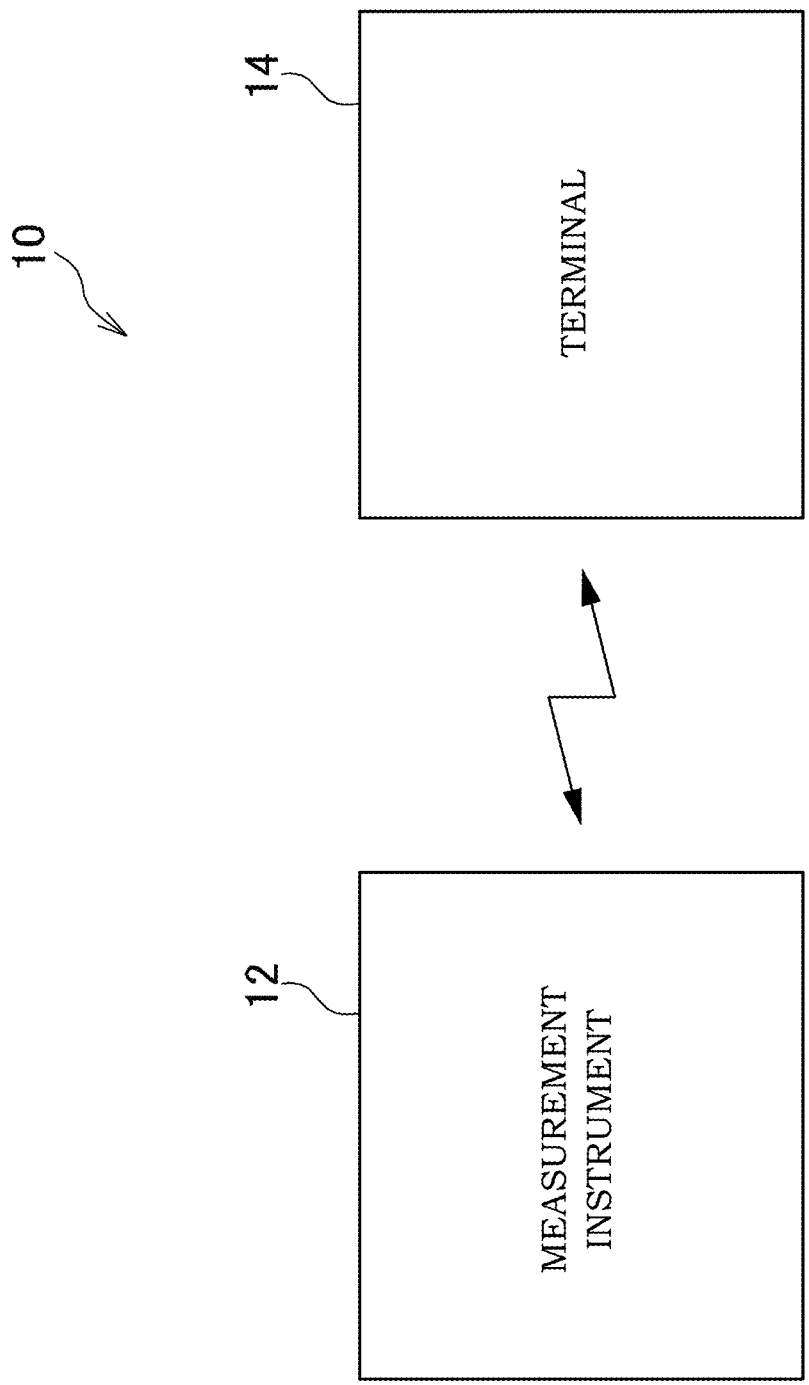
FIG. 1 is a block diagram showing the measurement system according to a first embodiment.

FIG. 1 is a block diagram showing a measurement system 10 according to the first embodiment. The measurement system 10 is formed of a measurement instrument 12 and a terminal 14 that are connected in a mutually communicatable manner.

The measurement instrument 12 is an apparatus for performing measurement of a target object. The measurement instrument 12 includes an apparatus for measuring electric voltage, electric current, or resistance value, an apparatus for measuring a state of the target object, or the like. In this embodiment, a description will be given of a battery tester the target object of which is a battery and that measures a state of a battery as an example of the measurement instrument 12. Here, as a measurement target group that is a plurality of measurement targets, a plurality of batteries 40 are employed.

The terminal 14 is formed of an apparatus with which an input operation can be performed. The terminal 14 includes a personal computer, a portable terminal, or the like, and in this embodiment, a description will be given of a smartphone that can be carried by a measurer as an example of the terminal 14.

(Hardware Configuration)
[Measurement Instrument]

Figure 2:
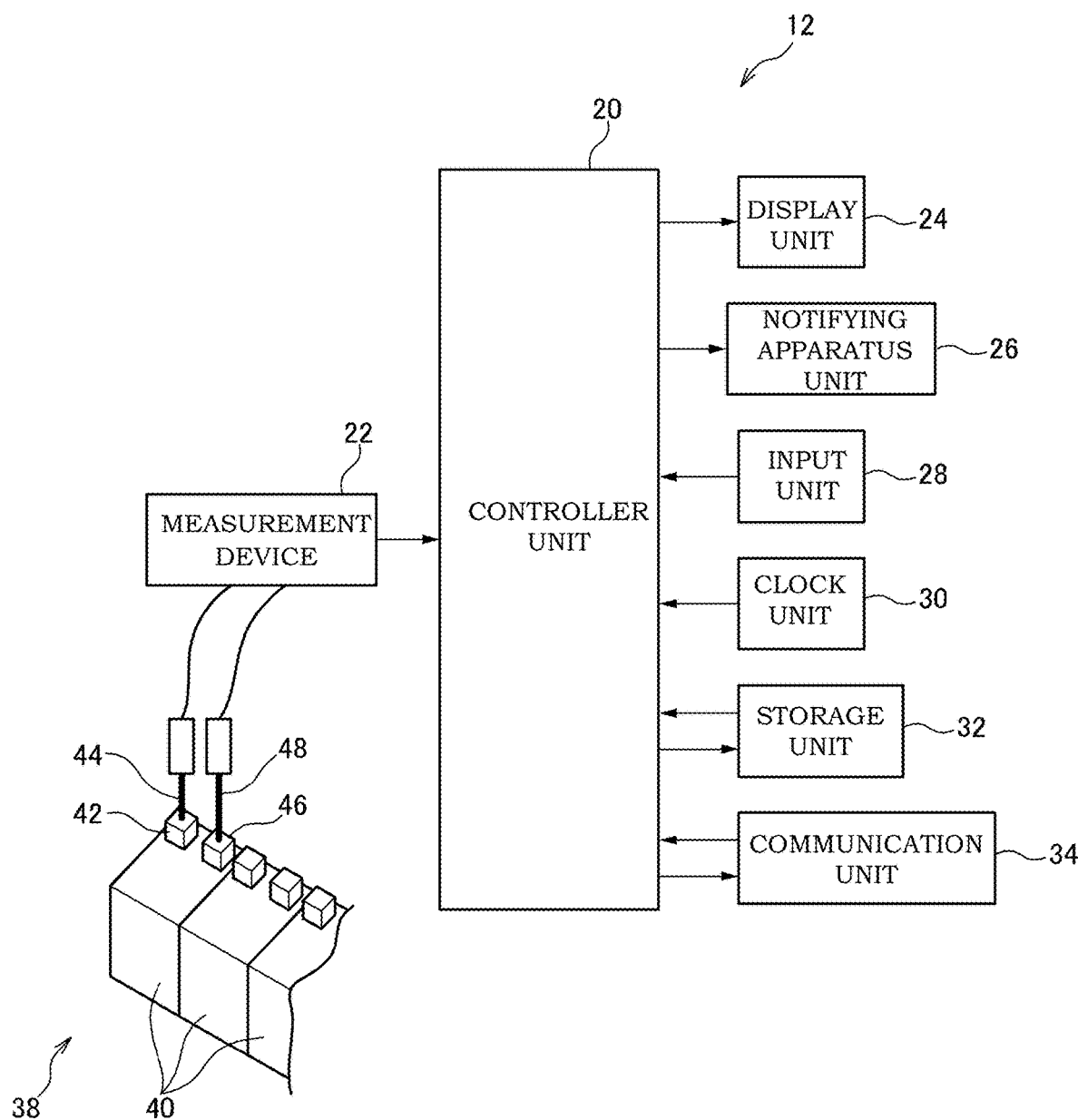
FIG. 2 is a block diagram showing a hardware configuration of the measurement instrument according to the first embodiment.

FIG. 2 is a block diagram showing a hardware configuration of the measurement instrument 12 according to the first embodiment. The measurement instrument 12 is formed of a controller unit 20 configuring a computer as a main component. A measurement device unit 22, a display unit 24, a notifying apparatus unit 26, an input unit 28, a clock unit 30, a storage unit 32, and a communication unit 34 are connected to the controller unit 20.

As an example, the measurement device unit 22 is provided with a positive electrode probe 44 that is to be connected to positive electrode terminals 42 of the batteries 40 of an uninterruptible power supply 38 and a negative electrode probe 48 that is to be connected to negative electrode terminals 46 and measures the resistance value indicating the internal resistance of the batteries 40 from electric current value between the both probes 44 and 48. In addition, the measurement device unit 22 measures an electric voltage value from the potential difference generated between the both probes 44 and 48 and measures a temperature value of the batteries 40 by detecting temperature of the respective electrode terminals 42 and 46 of the batteries 40.

The display unit 24 notifies the measurement results, etc. to the measurer by displaying them. As an example, the display unit 24 is formed of a liquid crystal display panel such as an LCD (Liquid Crystal Display), etc.

The notifying apparatus unit 26 notifies the measurer with a guide, an alarm sound, or the like. As an example, the notifying apparatus unit 26 is formed of a speaker.

The input unit 28 is formed of an input interface receiving the input operation by the measurer. As an example, the input unit 28 is formed of a plurality of operation buttons, and has a start button for starting the measurement, an end button for ending the measurement, a data input button for inputting data such as characters, numbers, or the like, and a data clear button for deleting data that has been saved.

The clock unit 30 outputs present year, month, day, and time to the controller unit 20.

The storage unit 32 stores a control program for controlling the operation of the measurement instrument 12. The storage unit 32 functions as a storage medium for storing a program realizing a function as an information processing apparatus. The storage unit 32 is formed of a nonvolatile memory (ROM; Read Only Memory), a volatile memory (RAM; Random Access Memory), and so forth.

In addition, in the storage unit 32, data to be used by the program is stored so as to be readable. Specifically, save data based on the measurement result of the measurement target is stored and saved in the storage unit 32 so as to be associated with specifying information received from the terminal 14. In the above, the save data means a central value such as the median, the mode, the mean value, or the like of the measurement result(s) acquired once or more than once.

The communication unit 34 forms an interface for transmitting and receiving the data. The communication unit 34 allows the transmission and reception of the data between the controller unit 20 and an external apparatus. The external apparatus includes, as an example, the terminal 14. The communication unit 34 performs the communication by utilizing, for example, a USB (universal serial bus), a wired LAN, Bluetooth®, a wireless LAN, and so forth.

The controller unit 20 is formed of a central processing unit (CPU) serving as a processor as a main component. The controller unit 20 reads out the program stored in the storage unit 32 and executes the program thus read out by the central processing unit, thereby controlling respective units of the measurement instrument 12.

When the program is supplied from the external apparatus, the controller unit 20 receives the program from the external apparatus via the communication unit 34 and stores the received program in the storage unit 32. When the communication unit 34 is formed of Internet connection apparatus, the controller unit 20 receives the program from a server, etc. that is the external apparatus via a network such as Internet network, a telephone network, and so forth and stores it in the storage unit 32.

[Terminal]

Figure 3:
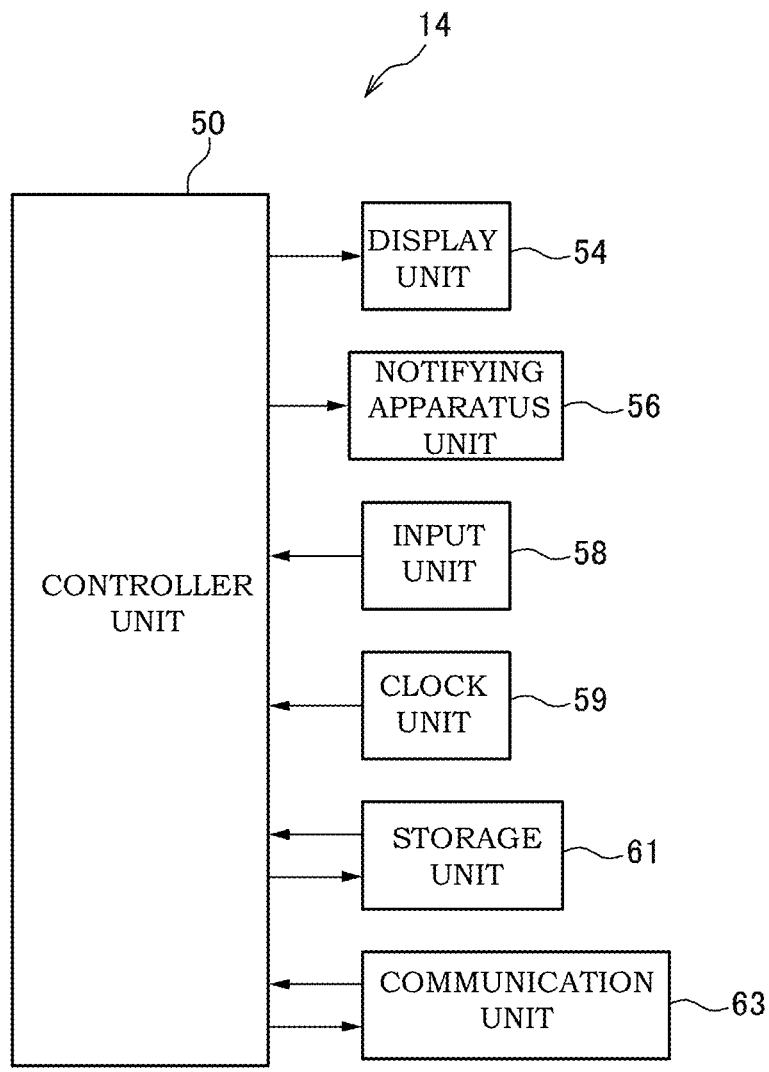
FIG. 3 is a block diagram showing a hardware configuration of a terminal according to the first embodiment.

FIG. 3 is a block diagram showing a hardware configuration of the terminal 14 according to the first embodiment. The terminal 14 is formed of a controller unit 50 configuring a computer as a main component. A display unit 54, a notifying apparatus unit 56, an input unit 58, a clock unit 59, a storage unit 61, and a communication unit 63 are connected to the controller unit 50.

The display unit 54 notifies the measurement results, etc. to the measurer by displaying them. As an example, the display unit 54 is formed of a liquid crystal display panel such as an LCD (Liquid Crystal Display), etc.

The notifying apparatus unit 56 notifies the measurer with a guide, an alarm sound, or the like. As an example, the notifying apparatus unit 56 is formed of a speaker and has a function of changing an output sound level.

The input unit 58 is formed of the input interface receiving the input operation by the measurer. The input unit 58 includes, as an example, the operation buttons, sound level buttons, and a touch panel. With the touch panel, by touching a display screen according to displayed contents on the display unit 54, the measurer performs input in accordance with the displayed contents. The sound level buttons are operated when a sound level output from the notifying apparatus unit 56 is to be changed.

The clock unit 59 outputs current year, month, day, and time to the controller unit 50.

The storage unit 61 stores the control program for controlling the operation of the terminal 14. The storage unit 61 functions as a storage medium for storing a measurement program realizing a function as the information processing apparatus. The storage unit 61 is formed of the nonvolatile memory (ROM), the volatile memory (RAM), and so forth.

In addition, in the storage unit 61, data to be used by the measurement program is stored so as to be readable. Specifically, the specifying information, etc. input from the input unit 58 is stored and saved in the storage unit 61.

The communication unit 63 forms an interface for transmitting and receiving the data, and thereby, the communication unit 63 allows the transmission and reception of the data between the controller unit 50 and the external apparatus. The external apparatus includes, as an example, the measurement instrument 12. The communication unit 63 of the terminal 14 is connected to the communication unit 34 of the measurement instrument 12 in a communicatable manner, and thereby, the data is exchanged between the controller unit 50 of the terminal 14 and the controller unit 20 of the measurement instrument 12.

The communication unit 63 performs the communication by utilizing, for example, the USB, the wired LAN, Bluetooth®, the wireless LAN, and so forth.

In this embodiment, the terminal 14 and the measurement instrument 12 are connected via, as an example, a wireless communication using Bluetooth® in a communicatable manner.

In this embodiment, although a description will be given of a case in which the terminal 14 and the measurement instrument 12 are connected via the wireless communication, the present invention is not limited thereto. For example, the terminal 14 and the measurement instrument 12 may be connected via wired communication with USB connection.

The controller unit 50 is formed of the central processing unit (CPU) serving as the processor as a main component. The controller unit 50 reads out the measurement program stored in the storage unit 61 and executes the measurement program thus read out by the central processing unit, thereby controlling respective units of the terminal 14.

When the measurement program is supplied from the external apparatus, the controller unit 50 receives the measurement program from the external apparatus via the communication unit 63 and stores the received measurement program in the storage unit 61. When the communication unit 63 is formed of Internet connection apparatus, the controller unit 50 receives the measurement program from the server, etc. that is the external apparatus via a network such as Internet network, a telephone network, and so forth and stores it in the storage unit 61.

(Function Block)

Figure 4:
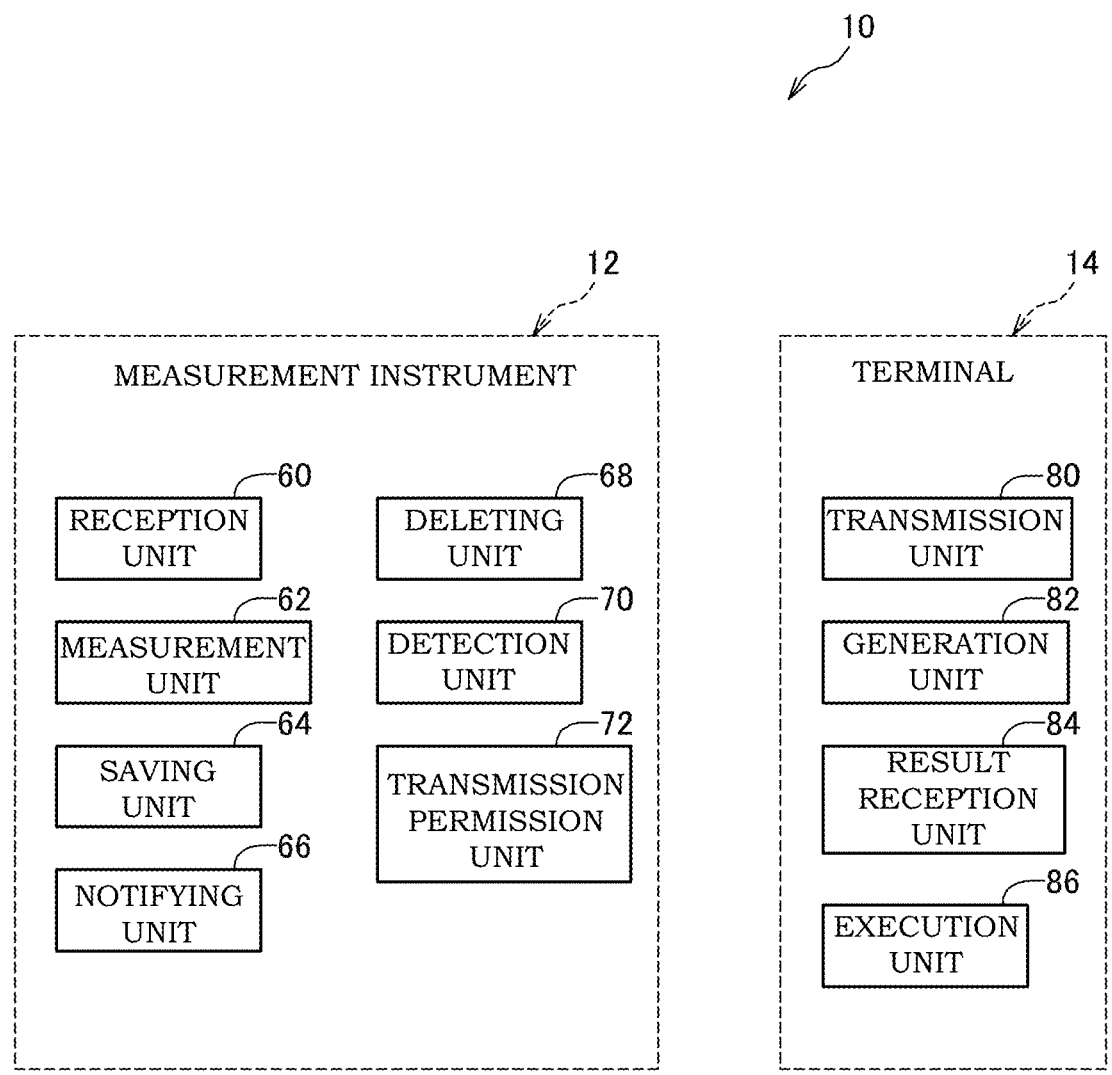
FIG. 4 is a function block diagram showing functions of respective units of the measurement system according to the first embodiment.

FIG. 4 is a function block diagram showing functions of respective units of the measurement system 10 according to the first embodiment.

[Measurement Instrument]

The measurement instrument 12 of the measurement system 10 is provided with a reception unit 60 forming reception means, a measurement unit 62 forming measurement means, a saving unit 64 forming saving means, a notifying unit 66 forming notifying means, and a deleting unit 68 forming deleting means. In addition, the measurement instrument 12 of the measurement system 10 is provided with a detection unit 70 forming detection means and a transmission permission unit 72 forming transmission permission means.

The reception unit 60 receives the specifying information from the terminal 14 via the communication unit 34.

The notifying unit 66 notifies respective identification data of the measurement target group in an order on the basis of the specifying information. In addition, when the deleting unit 68 has carried out deletion, the notifying unit 66 notifies the identification data that is associated with the save data that has deleted.

The measurement unit 62 executes a measurement processing for measuring the physical quantity of the measurement target. The detection unit 70 detects the execution of the measurement processing by the measurement unit 62. The detection of the execution of the measurement processing by the detection unit 70 serves as the trigger, and the transmission permission unit 72 gives permission to transmit the measurement result to the terminal 14.

When the measurement of the physical quantity of the measurement target based on the specifying information received from the terminal 14 is carried out by using the measurement unit 62, the saving unit 64 saves the save data based on the measurement result of the measurement target acquired by the measurement unit 62 in the storage unit 32 so as to be associated with the specifying information.

Specifically, the saving unit 64 saves the respective save data of the measurement target group acquired by the measurement unit 62 in association with the identification data and with target-group the specifying information that is the information of the measurement target group, on the basis of the specifying information. In addition, every time the notifying unit 66 notifies the identification data of the measurement target, the saving unit 64 saves the save data in association with the notified identification data.

The deleting unit 68 deletes the save data and the identification data that have been saved last by the saving unit 64 in accordance with operational input by the measurer.

As another function, the measurement instrument 12 transmits the identification data to be notified next by the notifying unit 66 to the terminal 14. In addition, when saving processing carried out by the saving unit 64 is finished, the measurement instrument 12 notifies the terminal 14 that the saving has been finished.

In this embodiment, the functions of the respective units of the measurement instrument 12 are realized by the controller unit 20 by executing the program read out from the storage unit 32.

[Terminal]

The terminal 14 of the measurement system 10 is provided with a transmission unit 80 forming transmission means, a generation unit 82 forming generation means, a result reception unit 84 forming result reception means, and an execution unit 86 forming execution means.

The generation unit 82 generates the specifying information in accordance with the input from the input unit 58. The transmission unit 80 transmits the specifying information that specifies the measurement target of the measurement instrument 12 to the measurement instrument 12 via the communication unit 63.

The result reception unit 84 receives the measurement result from the measurement instrument 12 via the communication unit 63. The execution unit 86 executes a predetermined processing on the basis of the received measurement result. A predetermined processing includes, as an example, display of the measurement result, guide of the measurement target, or the like.

When the terminal 14 receives the identification data from the measurement instrument 12, the terminal 14 notifies the received identification data. In addition, when it is notified that the saving is finished from the measurement instrument 12, the terminal 14 notifies the identification data that is to be notified next. Then, the terminal 14 notifies the identification data of the measurement target with a sound.

In this embodiment, the functions of the respective units of the terminal 14 are realized by the controller unit 50 by executing the measurement program read out from the storage unit 61.

(Description of Operation)

Next, operation of the measurement system 10 will be described with reference to FIGS. 5 to 17. In the following, a description will be given by following processing procedure executed by the processor of the controller unit 20 in the measurement instrument 12 and the processing procedure executed by the processor of the controller unit 50 in the terminal 14.

In this embodiment, a description will be given of a case in which, as an example, the measurement is performed for the respective batteries 40 of the uninterruptible power supply 38 (UPS) installed in respective rooms (see FIG. 2). However, the present invention is not limited thereto, and the present invention may be applied to measure the electric voltage, the electric current, or the resistance value at various points of the measurement target.

Figure 5:
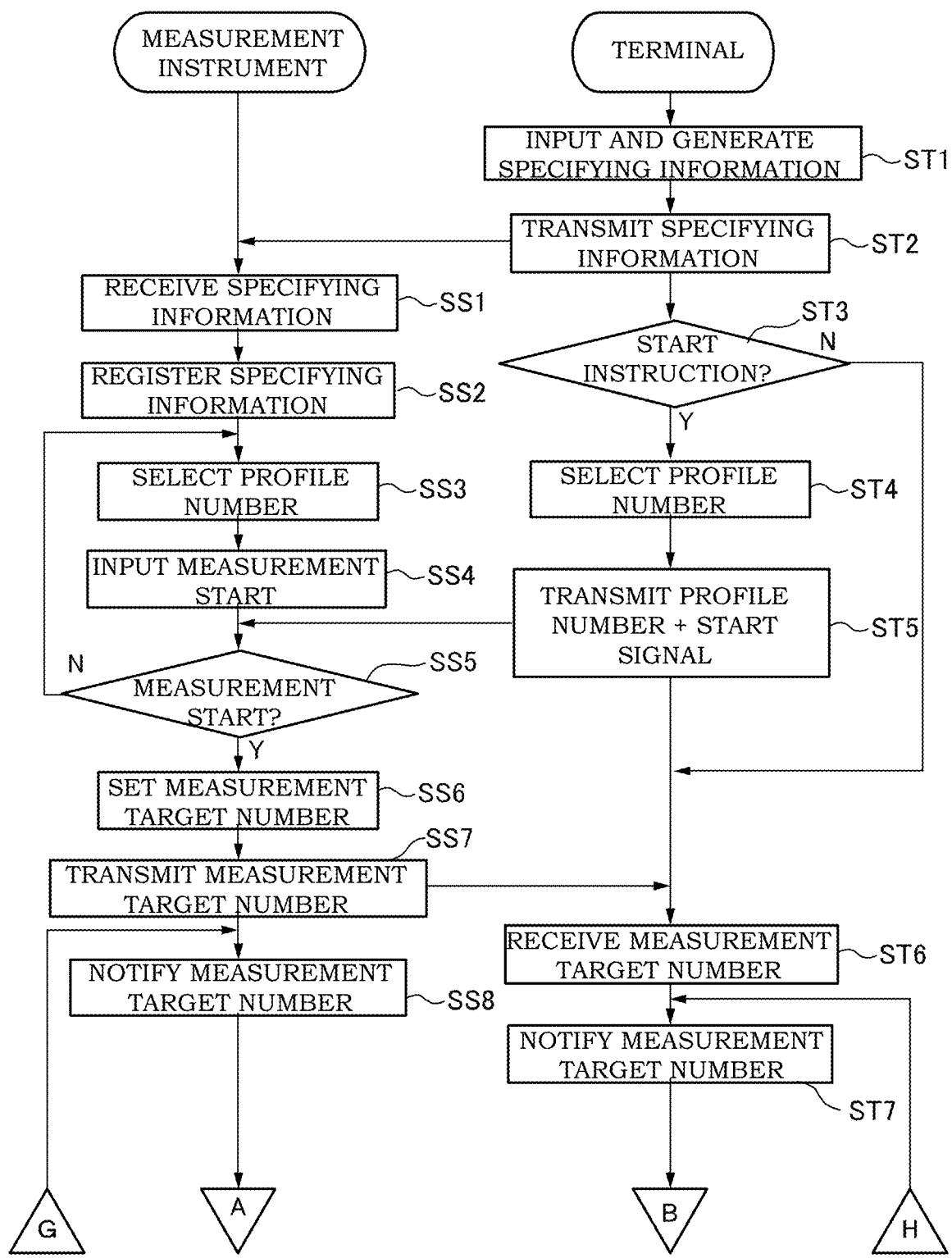
FIG. 5 is a flowchart showing an operation of a measurement system according to the first embodiment.
Figure 6:
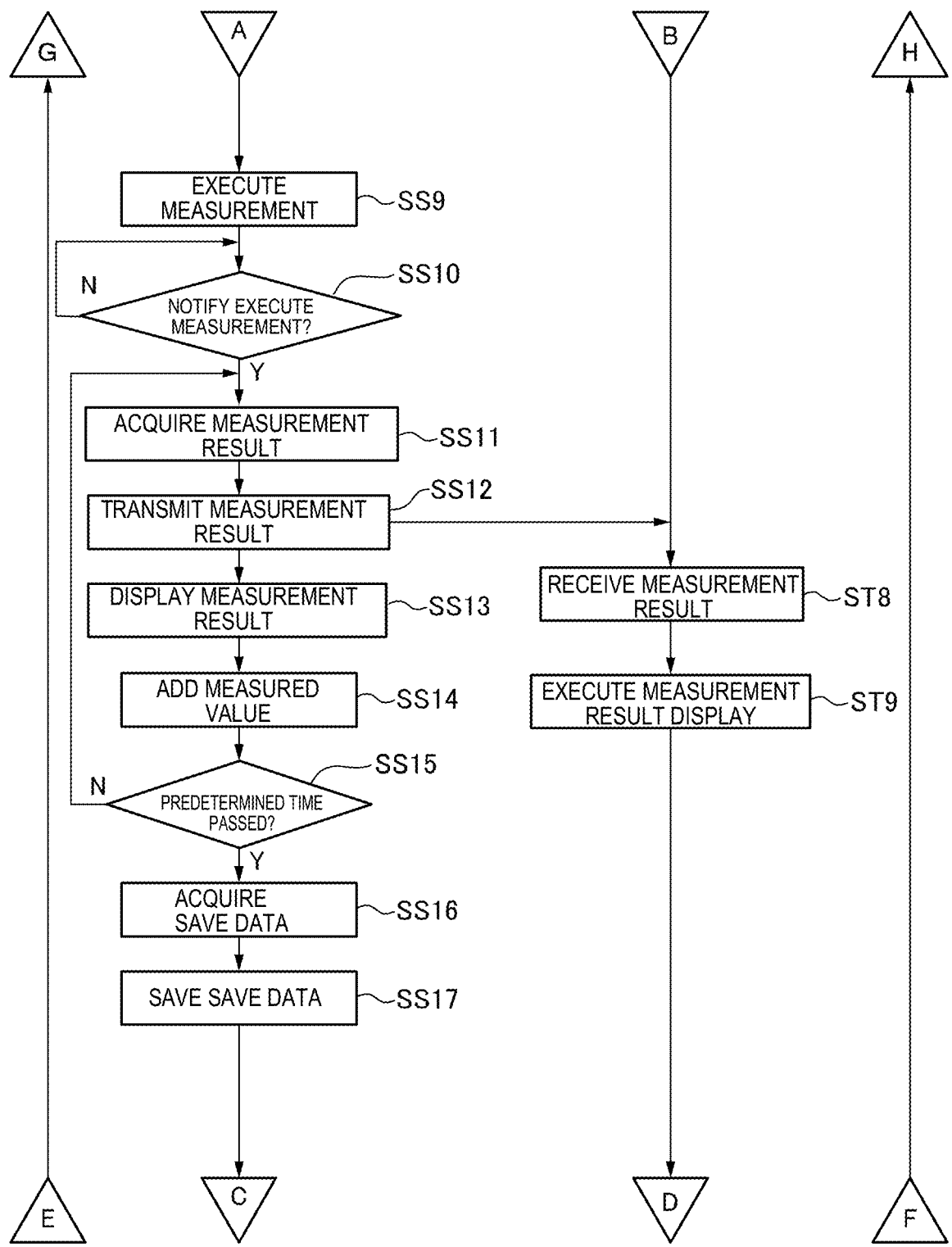
FIG. 6 is a flowchart showing the operation continued from FIG. 5.
Figure 7:
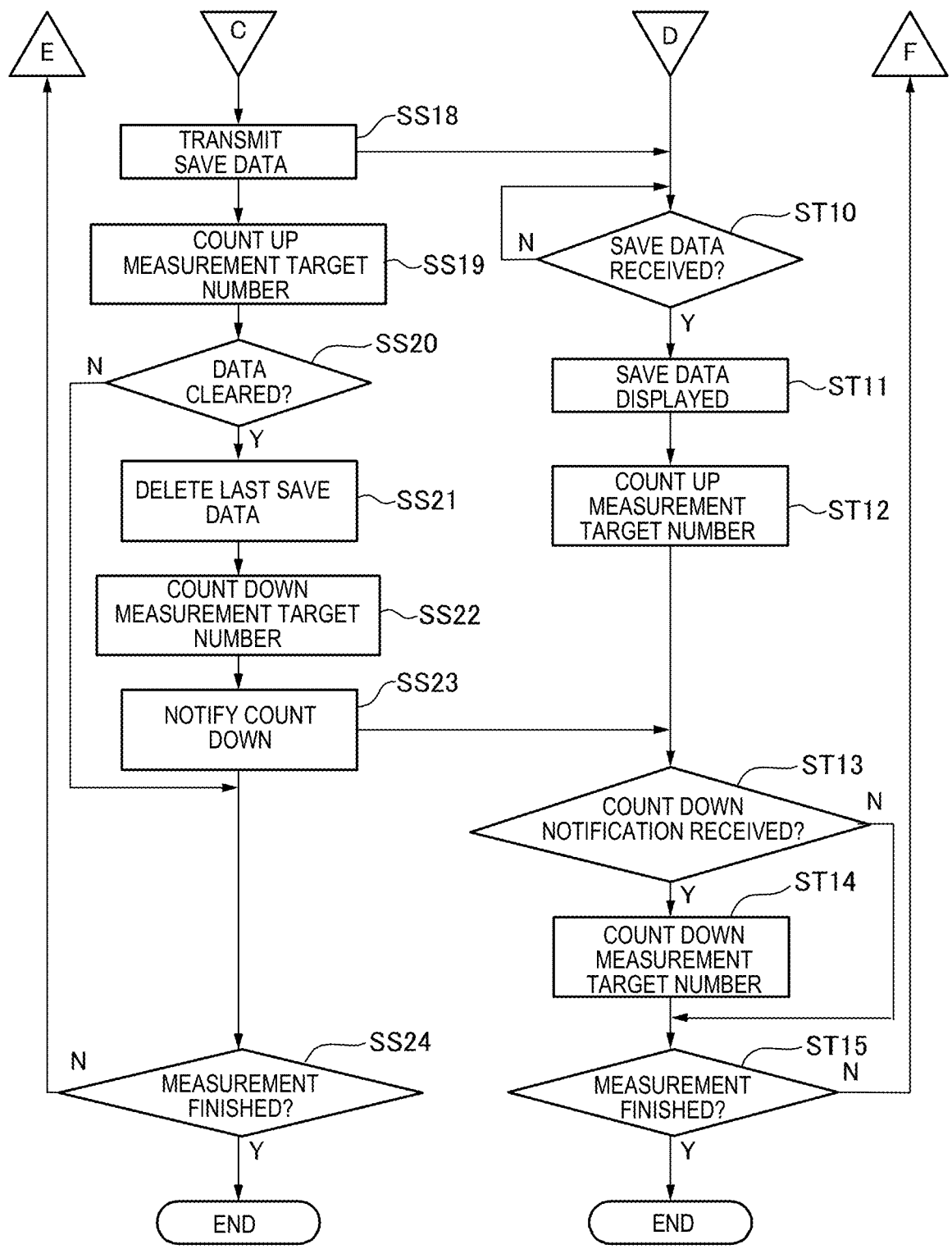
FIG. 7 is a flowchart showing the operation continued from FIG. 6.

FIG. 5 is a flowchart showing the operation of the measurement system 10 according to the first embodiment. FIG. 6 is a flowchart showing the operation continued from the operation in FIG. 5, and FIG. 7 is a flowchart showing the operation continued from the operation in FIG. 6.

When the measurement of the batteries 40 of the uninterruptible power supply 38 is to be started, the processor of the controller unit 20 of the measurement instrument 12 starts the operation in accordance with the program stored in the storage unit 32. In addition, the processor of the controller unit 50 of the terminal 14 starts the operation in accordance with the measurement program stored in the storage unit 61.

In the terminal 14, as input and generation processing of the specifying information are executed, the terminal 14 generates the specifying information as inputting the information for specifying the measurement target is input from the input unit 58 (Step ST1).

Here, the specifying information will be described with reference to FIG. 17. A detail of FIG. 17 will be described below. In addition, specifying information 90 can also be referred to as profile information.

The specifying information 90 includes profile number information 92 indicating the number of the specifying information 90, target-group specifying information 96, and identification data 98 managing each target in the measurement target group.

The profile number information 92 that is the specifying information 90 includes a profile number 91, and as an example, the profile number information 92 is formed of a number "1" indicating the number for specifying the specifying information 90.

As an example, the target-group specifying information 96 includes positional information 100 indicating an installed position of the measurement target provided, and the positional information 100 is formed of room information 102 specifying the room at which the measurement target group is installed. As an example, the room information 102 is formed of a character string "HIOKI 1F UPS-ROOM" indicating a company name, a floor number, and a room name.

The target-group specifying information 96 includes, as an example, device information 104 indicating the target object that is a target of the measurement, and the device information 104 is formed of category information 106 indicating a category of a device. The category information 106 is formed of, as an example, the character string "UPS1-1" for specifying the installed uninterruptible power supply 38.

The identification data 98 is formed of a battery number 108 for specifying the battery 40, and the battery number 108 is formed of, as an example, the number "1" indicating the number assigned to each of the batteries 40.

In this embodiment, although the battery number 108 indicating the identification data 98 of the specifying information 90 is formed of the number, the present invention is not limited thereto. For example, the identification data 98 may be formed of the character string.

Furthermore, the specifying information 90 will be described with reference to FIG. 9. A detail of FIG. 9 will be described below.

The specifying information 90 includes management information 110 for specifying the identification data 98. The management information 110 is the information for specifying a group of the identification data 98 set for the specifying information 90 the profile number 91 of which is "1", and as the management information 110, "1" indicating a starting number 112 and "50" indicating a finish number 114 are shown as an example.

The specifying information 90 is stored in respective areas allocated to the storage unit 32 forming the memory of the measurement instrument 12, and a plurality of identification data 98 specified by the management information 110 and memory identification data 116 indicating a memory number 115 identifying the respective areas are associated in a one-to-one fashion.

In a specific description, "1" of the identification data 98 that is specified by the management information 110 corresponds to "A.001" of the memory identification data 116. In addition, each of the numbers "2" to "50" of the identification data 98 corresponds to each of "A.002" to "A.050" of the memory identification data 116.

Then, the respective data of the areas from "A.001" that is the memory number 115 indicated by "1" that is the starting number 112 to "A.050" that is the memory number 115 indicated by "50" that is the finish number 114 are stored as being associated with the positional information 100 and the device information 104.

With such a configuration, compared with a case in which measurement data 194 of the respective memory number 115 is stored by adding the positional information 100 and the device information 104 thereto, it is possible to suppress a usage of the storage unit 32.

Next, a method of generating the specifying information 90 in Step ST1 shown in FIG. 5 will be described specifically with reference to FIG. 8.

Figure 8:
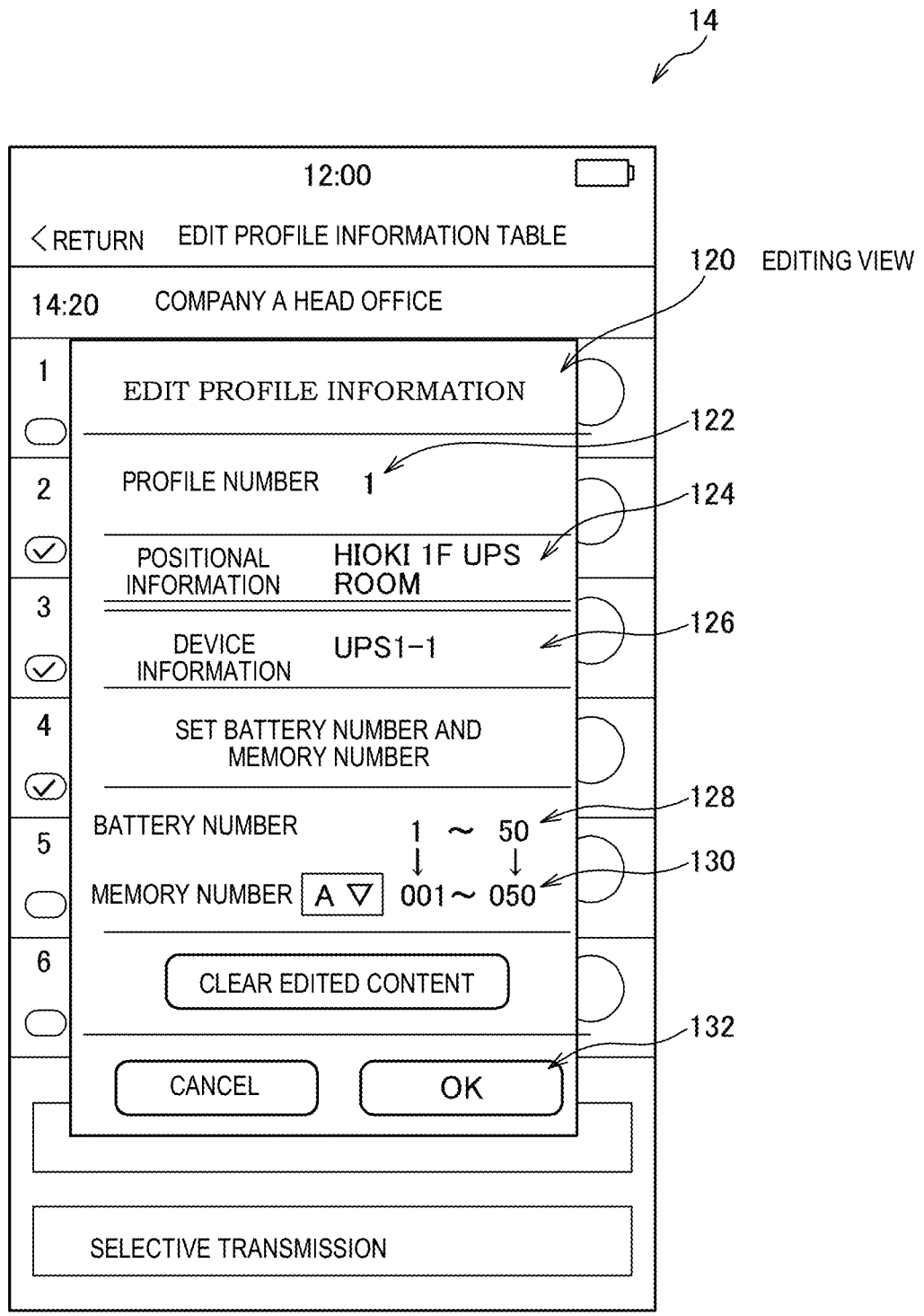
FIG. 8 is a diagram showing an example of an editing view of profile information displayed on the terminal.

FIG. 8 is a diagram showing an example of an editing view 120 of the profile information displayed on the terminal 14. In the terminal 14, when editing of the profile information is started for generating the specifying information 90, the editing view 120 of the profile information is displayed on the display unit 54 of the terminal 14, as shown in FIG. 8.

In accordance with the display of the editing view 120, the measurer input "1" indicating the profile number 91 in a profile number field 122 in the editing view adsnd input the character string "HIOKI 1F UPSROOM" indicating the room information 102 of a room, where the measurement is to be performed, in a positional information field 124 indicating the positional information 100.

In this embodiment, although a description will be given of a case in which the room information 102 of the specifying information 90 is formed of the character string, the present invention is not limited thereto. For example, the room information 102 indicating the positional information 100 may be a mapping number set for respective places in a floor map. In this case, the terminal 14 displays the floor map on the display unit 54 and displays a marker at the position of the floor map indicated by the mapping number, and thereby, the installed position of the uninterruptible power supply 38 may be shown.

In addition, the measurer inputs, in a device information field 126, the character string "UPS1-1" indicating the category information 106 of the uninterruptible power supply 38, where the measurement is to be performed.

The measurer then inputs, in a battery number field 128, "1" indicating the identification data of the battery number, the measurement of which is performed first, and inputs "50" indicating the identification data of the battery number, the measurement of which is performed last.

Figure 17:
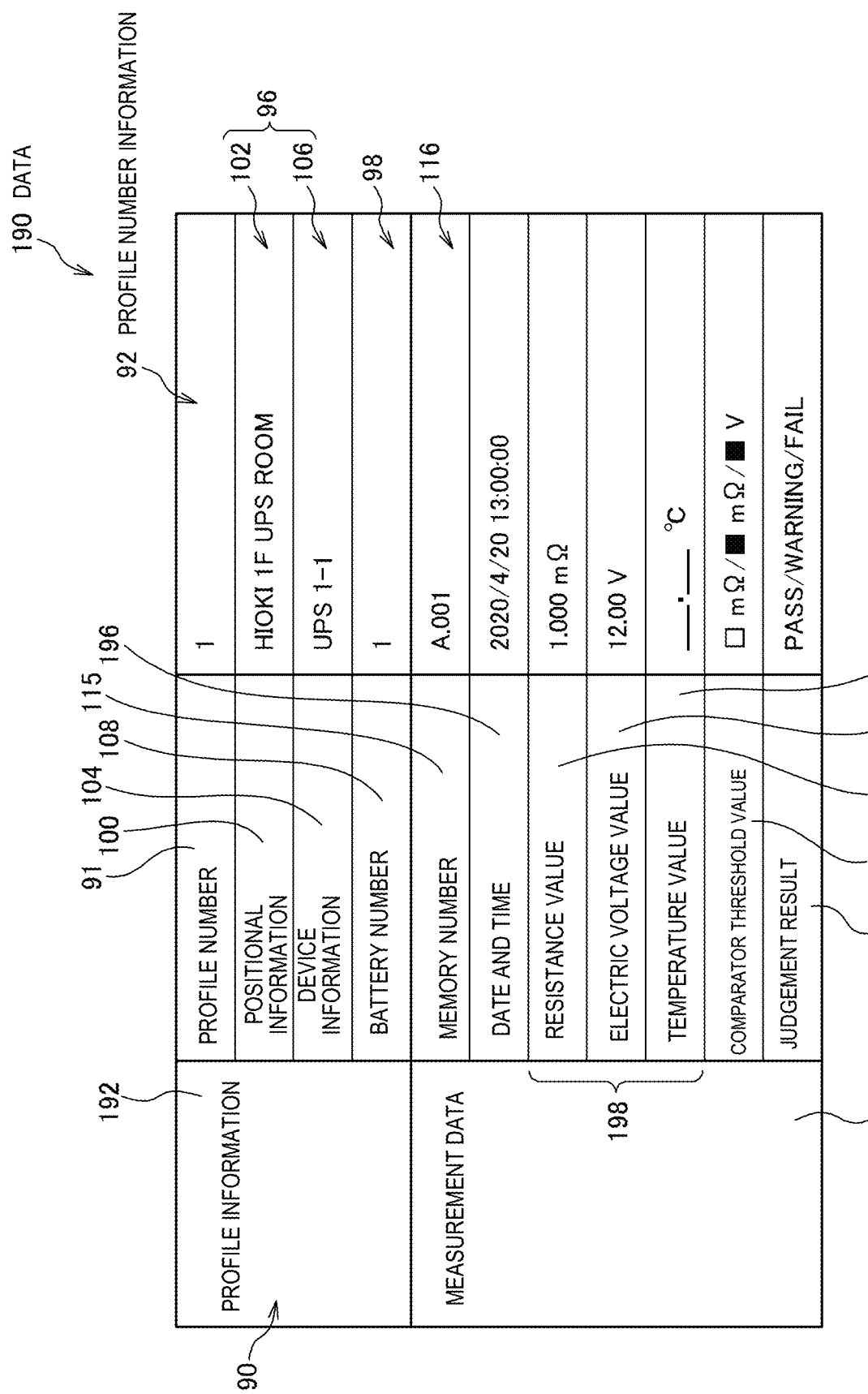
FIG. 17 is an explanatory diagram showing an example of data saved in the measurement instrument.

In addition, the measurer inputs, in a memory number field 130, "A.001" indicating the memory identification data 116 as the memory number 115 for specifying the area for storing the measurement result of the battery 40, the identification data 98 of which is "1" and the measurement of which is performed first (see FIG. 17). Furthermore, the measurer inputs, in the memory number field 130, "A.050" indicating the memory identification data 116 as the memory number 115 for specifying the area for storing the measurement result of the battery 40, the identification data 98 of which is "50" and the measurement of which is performed last.

These inputs can be achieved by touching the touch panel forming the input unit 28 using a finger, a touch pen, or the like.

In the editing view 120, when the measurer touches "OK" button 132, as shown in FIG. 5, the terminal 14 transmits, to the measurement instrument 12, the specifying information 90 for specifying the measurement target for the measurement instrument 12 (Step ST2).

Subsequently, the measurement instrument 12 receives the specifying information 90 transmitted from the terminal 14 (Step SS1) and register the received specifying information 90 (Step SS2). This registration will be described with reference to FIG. 9.

Figure 9:
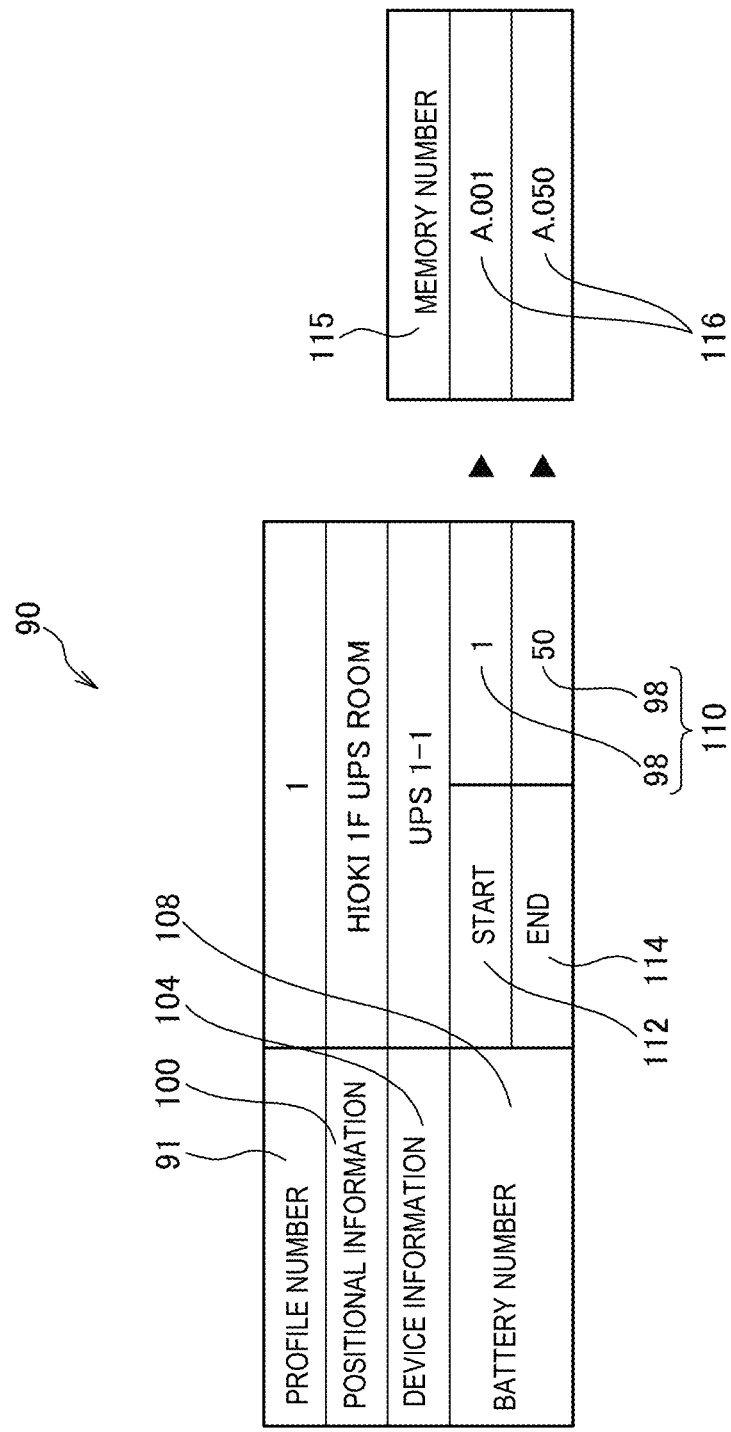
FIG. 9 is an explanatory diagram showing an example of a relationship between specifying information and a memory number associated with the specifying information.

FIG. 9 is an explanatory diagram showing an example of a relationship between the specifying information 90 and the memory number 115 associated with the specifying information 90 and shows the specifying information 90 that is stored in the storage unit 32 of the measurement instrument 12.

As the profile number 91 of the specifying information 90, "1" is stored, and the specifying information 90 indicates that the profile number 91 is the information of "1". As the positional information 100, "HIOKI 1F UPSROOM" is stored, and "UPS1-1" is stored in a device information field 104.

As the starting number 112 of the battery number 108, "1" is stored, and as the memory number 115 associated with "1", "A.001" is stored. In addition, as the finish number 114 of the battery number 108, "50" is stored, and as the memory number 115 associated with "50", "A.050" is stored.

The specifying information 90 the profile number 91 of which is "1" is used for the measurement of the batteries 40 having the battery number of "1" to "50" of the uninterruptible power supply 38 of "UPS1-1" that is installed in "HIOKI 1F UPSROOM".

The operation performed, when the measurement is performed on the batteries 40 that are the measurement target group, by using the measurement instrument 12 will be described with reference to FIGS. 10 to 17.

Figure 10:
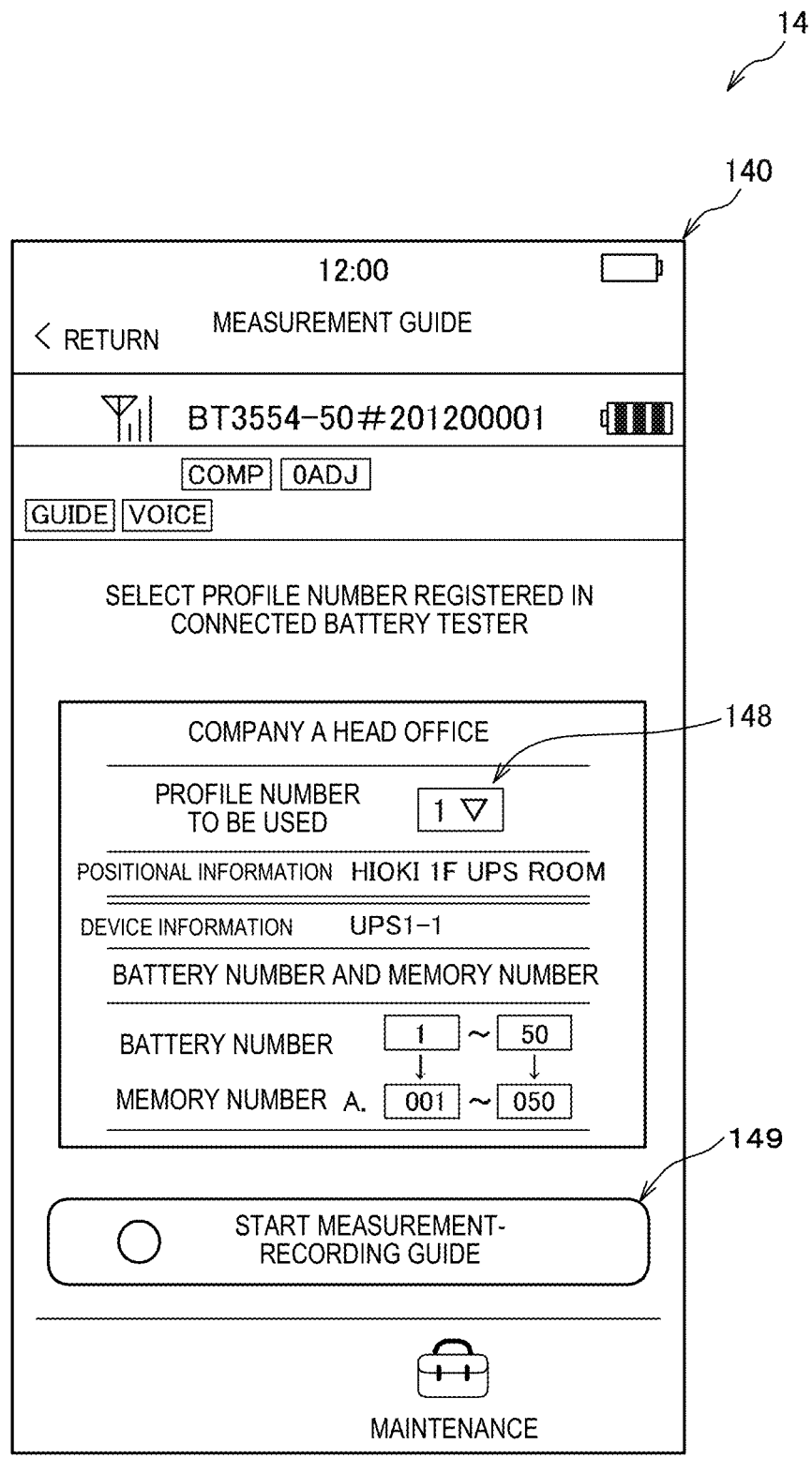
FIG. 10 is a diagram showing an example of a measurement guide view displayed on the terminal before the measurement is started.
Figure 11:
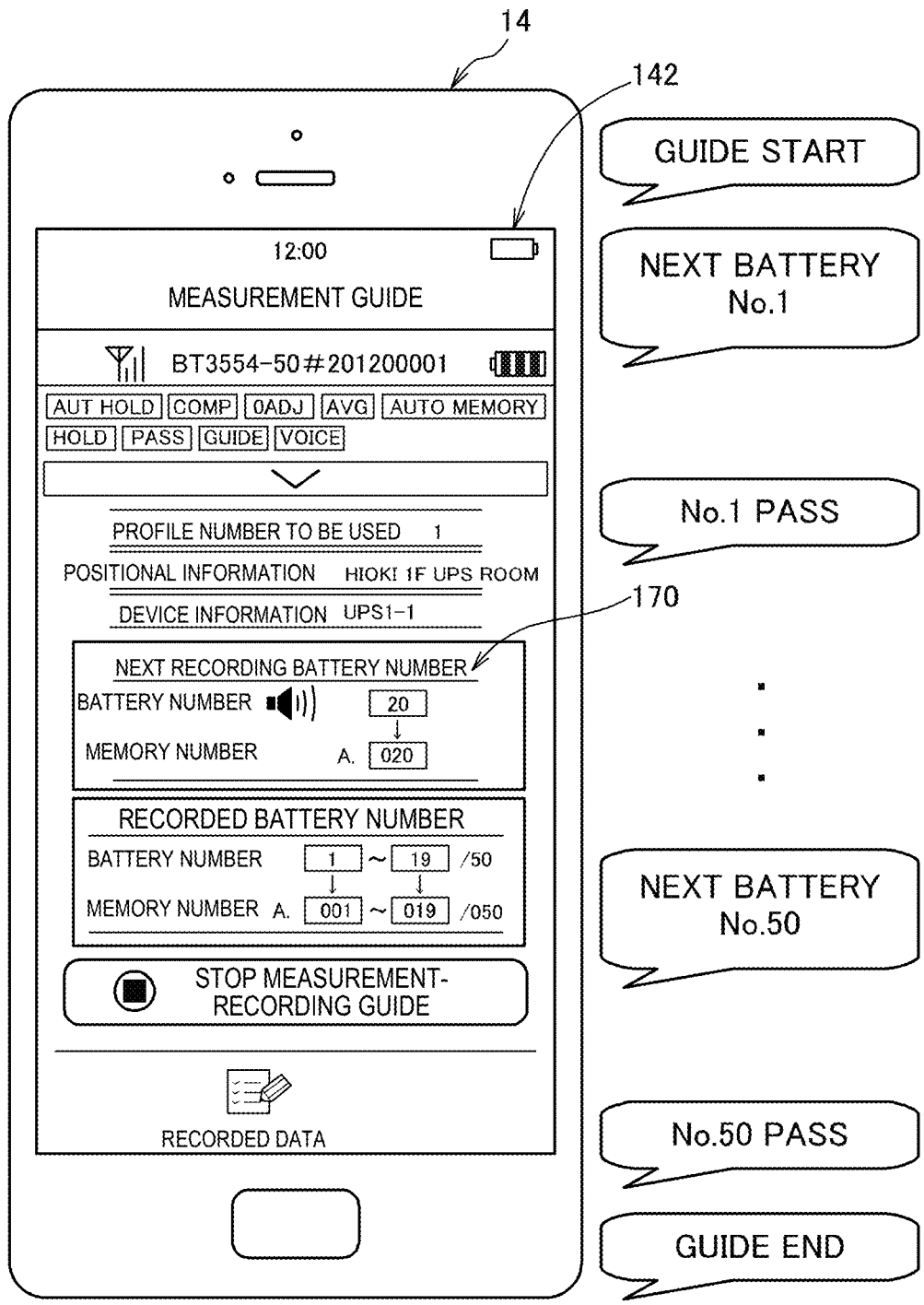
FIG. 11 is an explanatory diagram explaining an example of a notifying view displayed on the terminal and an audio guide from the terminal.
Figure 12:
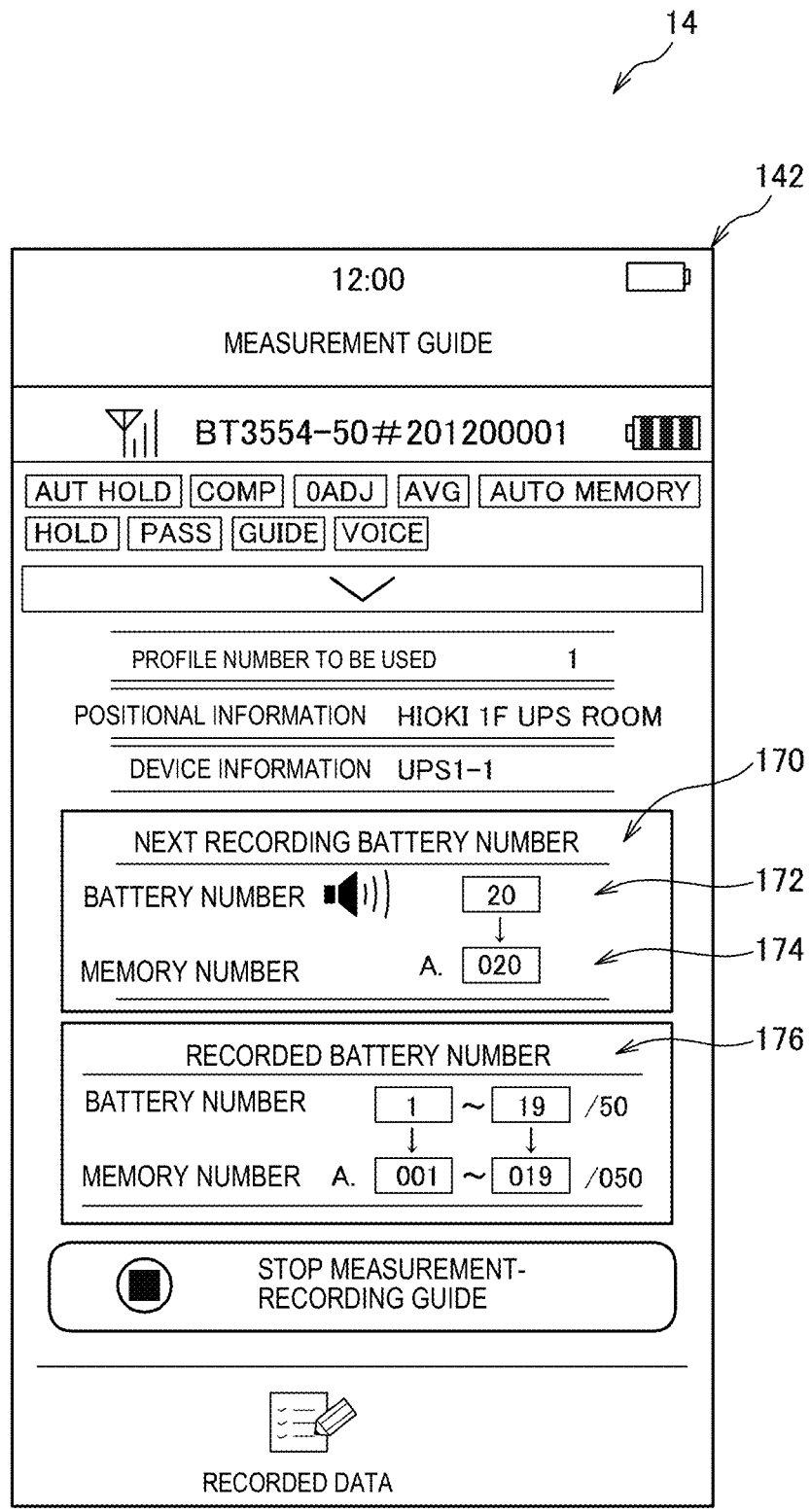
FIG. 12 is a diagram showing an example of the notifying view displayed on the terminal after the measurement is started.

FIG. 10 is a diagram showing an example of a pre-start measurement guide view 140 displayed on the terminal 14 before the measurement is started. FIG. 11 is an explanatory diagram explaining an example of a notifying view 142 displayed on the terminal 14 and the audio guide from the terminal 14. FIG. 12 is a diagram showing an example of the notifying view 142 displayed on the terminal 14 after the measurement is started.

When the measurement is to be started with the measurement instrument 12, as shown in FIG. 5, the profile number 91 to be used is input (Step SS3) and a measurement-recording guide start button 146 is input (Step SS4).

Specifically, as shown in FIG. 10, from the pre-start measurement guide view 140 displayed on the display unit 24, a person performing the measurement is prompted to select the profile number 91 to be used. In contrast, as an example, the measurer touches a measurement-recording guide start button 149 after selecting "1" in a field 148 for profile number to be used.

Next, as shown in FIG. 5, it is judged whether or not the measurement is started from an operation state of the measurement-recording guide start button 149 (Step SS5), and when it is judged that the measurement is not started, the processing is branched to Step SS3, whereas when it is judged that the measurement is started, the processing proceeds to next Step SS6.

The processing corresponding to Step SS3 to Step SS4 can also be carried out by the terminal 14.

In other words, in the terminal 14, it is judged whether or not a start instruction is given by detecting whether or not a start button for starting the measurement is pressed, for example (Step ST3). When the start instruction is not given, the processing is branched to Step ST6, whereas when the start instruction is give, similarly to the processing in Step SS3, the profile number 91 to be used is input (Step ST4).

Next, when the measurement-recording guide start button 149 displayed on the terminal 14 is pressed, the input profile number 91 and a start signal are transmitted to the measurement instrument 12 (Step ST5).

The measurement instrument 12 that has received the profile number 91 and the start signal from the terminal 14 judges that the measurement is started (Step SS5), and the processing proceeds to next Step SS6.

In Step SS6, the measurement instrument 12 sets the measurement target number indicating the measurement target, the measurement of which is performed first, from the specifying information 90 of the profile number 91 selected in the measurement instrument 12 or the terminal 14 and stores it in the storage unit 32 (Step SS6). Next, the set measurement target number is transmitted to the terminal 14 (Step SS7), and the measurement target number is notified (Step SS8).

The terminal 14 receives the measurement target number transmitted from the measurement instrument 12 and stores it in the storage unit 61 (Step ST6), and then, notifies the received measurement target number with a sound (Step ST7).

Figure 13:
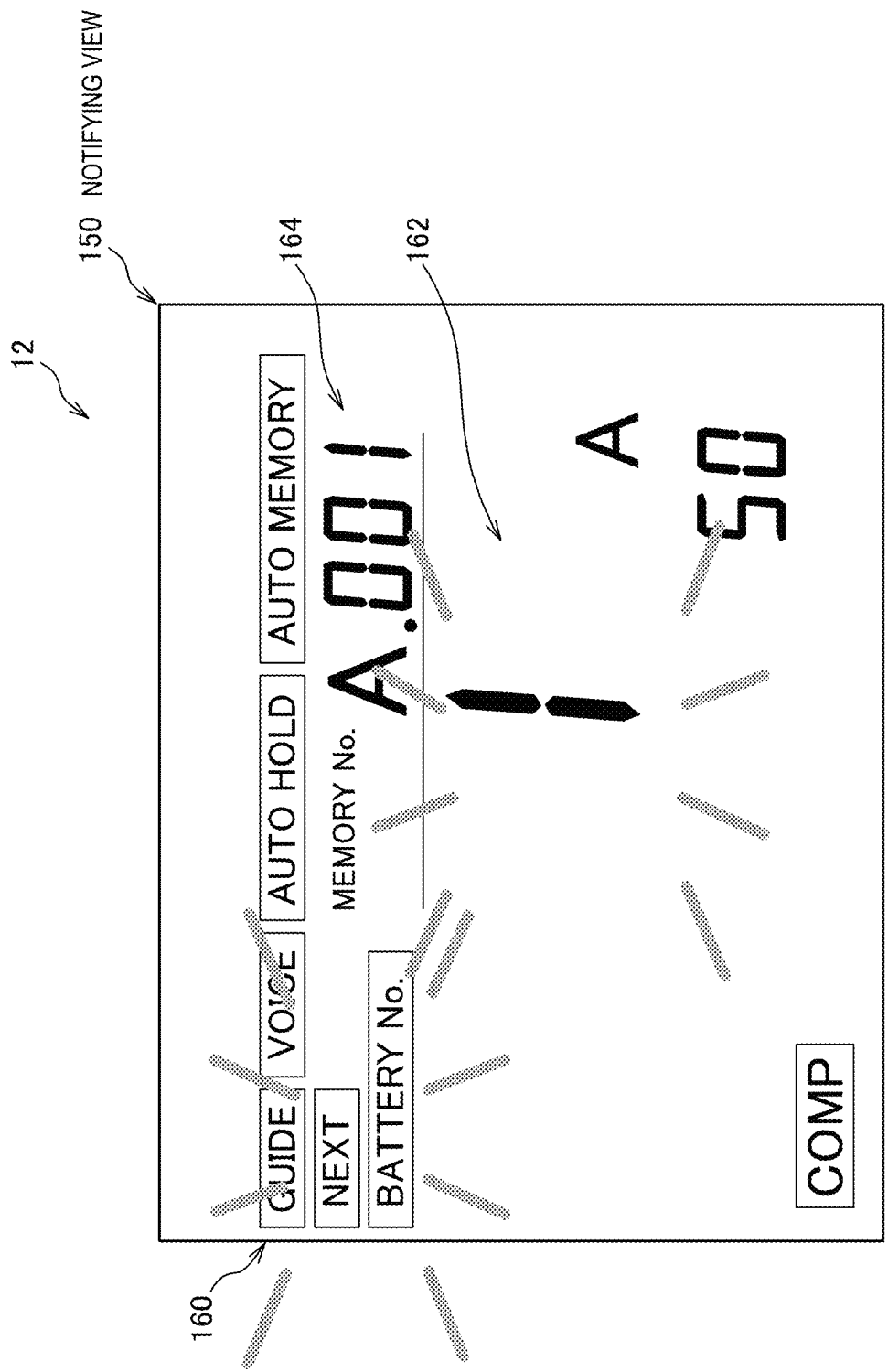
FIG. 13 is a diagram showing an example of the notifying view for a battery number "1" displayed on the measurement instrument.
Figure 14:
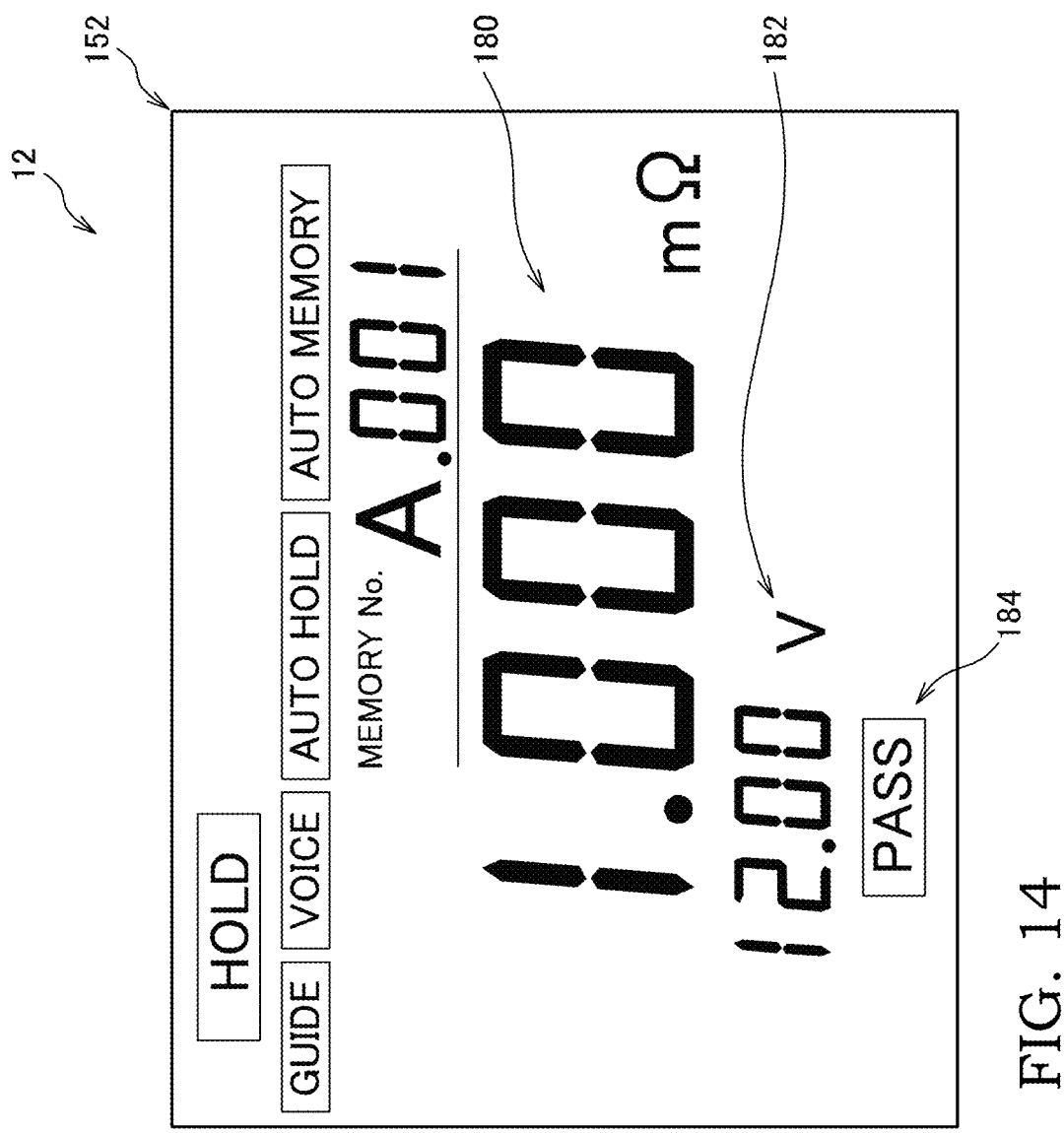
FIG. 14 is a diagram showing an example of a displayed view of a measurement result for the battery number "1" displayed on the measurement instrument.

Next, a specific example of a notifying method in a measurement target method will be described with reference to FIGS. 13 to 16. FIG. 13 is a diagram showing an example of a notifying view 150 of a the battery number "1" displayed on the display unit 24 of the measurement instrument 12. FIG. 14 is a diagram showing an example of a measurement result displayed view 152 of the battery number "1" displayed on the display unit 24 of the measurement instrument 12.

In Step SS7 shown in FIG. 5, The measurement instrument 12 sets "1" for the measurement target number, the measurement of which is performed first, from the starting number 112 of the battery number 108 in the specifying information 90 the selected profile number 91 of which is "1" and transmits thus set "1" to the terminal 14.

Next, the measurement instrument 12 notifies the start of the measurement by outputting a sound "GUIDE START" from the notifying apparatus unit 26. In addition, as shown in FIG. 13, in the measurement instrument 12, "NEXT BATTERY No." is displayed in a display content field 160 in the notifying view 150 and "1" that is the battery number 108 of the measurement target is flashed in a battery number field 162.

Furthermore, the measurement instrument 12 outputs a sound "NEXT BATTERY No. 1" and notifies that the next measurement target is the battery 40 the battery number 108 of which is "1". In addition, "A.001" is displayed in a memory number field 164, thereby indicating that the measurement result is recorded in the area the memory number 115 of which is "A.001". As described above, the batteries 40 are measured in an order of the battery number 108.

Figure 15:
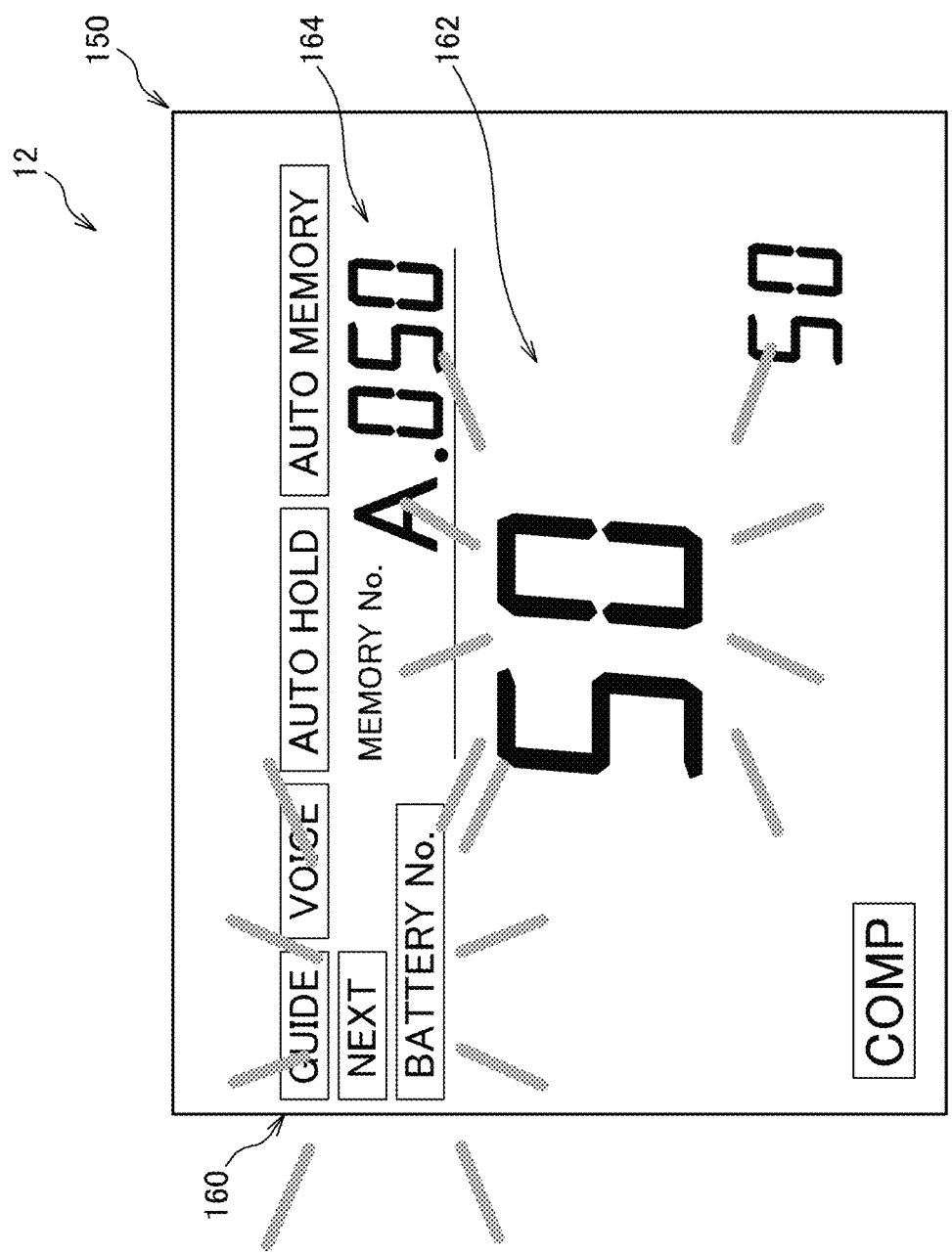
FIG. 15 is a diagram showing an example of the notifying view for a battery number "50" displayed on the measurement instrument.

FIG. 15 is a diagram showing an example of the notifying view 150 displayed on the measurement instrument 12 when the battery number 108 is "50".

In Step SS19 shown in FIG. 7, which will be described later, the measurement target number is counted up, and when the measurement target number is counted up to "50", "NEXT BATTERY No." is displayed in the display content field 160 of the notifying view 150 by the processing in Step SS8, as shown in FIG. 15. In addition, in the battery number field 162 of the notifying view 150, "50" that is the battery number 108 of the measurement target is flashed and a sound "NEXT BATTERY No. 50" is output.

Furthermore, "A.050" is displayed in the memory number field 164 of the notifying view 150, thereby indicating that the measurement result is recorded in "A.050".

In the above, in the notifying view 150 shown in FIGS. 13 and 15, a total number of the batteries 40 that are the measurement targets may be displayed.

Next, the operation of the terminal 14 will be described with reference to FIG. 11. FIG. 11 shows the notifying view 142 in a state in which the measurement of the batteries 40 the battery numbers 108 of which are "1" to "19" are finished. In the notifying view 142, "20" that is the battery number 108 of the measurement target is indicated in a next recording battery number field 170.

The terminal 14 notifies that the start of the measurement by outputting the sound "GUIDE START" from the notifying apparatus unit 56. Subsequently, terminal 14 displays "1" indicating the battery number 108 that is the identification data 98 of the measurement target in the notifying view 142, outputs the sound "NEXT BATTERY No. 1", and notifies that the next measurement target is the battery 40 the battery number 108 of which is "1".

By doing so, in Step SS7 shown in FIG. 5, the measurement instrument 12 transmits the identification data 98 to be notified next to the terminal 14, and after receiving the identification data 98 from the measurement instrument 12 in Step ST6, the terminal 14 notifies the received identification data 98 in Step SS7.

FIG. 12 is a diagram showing display example of the measurement instrument 12. FIG. 12 shows a case in which the battery number 108 of the battery 40, which will be the next measurement target, is "20".

In the notifying view 142 displayed on the display unit 24 of the measurement instrument 12, "20" is displayed in a battery number field 172 of the next recording battery number field 170, thereby indicating that the next measurement target is the battery 40 the battery number of which is "20". In addition, "A.020" is displayed in a memory number field 174, thereby indicating that the measurement result is recorded in "A.020".

Next, a recorded battery number field 176 shows that the measurement results for the battery number 108 of "1" to "19" have been recorded in the respective areas, the memory number 115 of which are "A.001" to "A.019".

In the above, in the notifying view 142 shown in FIG. 12, the total number of the batteries 40 that are the measurement targets may be displayed.

Next, as shown in FIG. 6, the measurement instrument 12 executes the measurement processing for measuring the physical quantity of the measurement target by using the measurement device unit 22 (Step SS9) and detects whether or not the measurement processing is executed (Step SS10). When the execution of the measurement processing is detected, the processing proceeds to next Step SS11, whereas when the execution of the measurement processing is not detected, the processing stands by until the execution is detected.

In a specific description, as shown in FIG. 2, the measurer connects the positive electrode probe 44 of the measurement device unit 22 to the positive electrode terminal 42 of the battery 40 that is the measurement target and connects the negative electrode probe 48 to the negative electrode terminal 46 of the battery 40, thereby performing the measurement. At this time, the measurement device unit 22 applies a detection AC signal between the positive electrode probe 44 and the negative electrode probe 48 and detects whether or not AC electric current is flowing between the both probes 44 and 48 in a manner corresponding to the detection AC signal. When the AC electric current is detected, because it is possible to confirm the connection of the respective probes 44 and 48 to the respective electrode terminals 42 and 46 and the current flow therebetween, it is judged that the measurement processing is executed.

In Step SS10 shown in FIG. 6, when the execution of the measurement processing is detected, the measurement result is acquired once every 200 mS (seconds) as an example (Step SS11). Next, the detection of the execution of the measurement processing serves as the trigger, and the transmission of the measurement result to the terminal 14 is permitted, and thereby, the measurement result is transmitted to the terminal 14 (Step SS12).

In a specific description, until the execution of the measurement processing is detected in Step SS10, the measurement instrument 12 is in a prohibited state in which the transmission of the measurement result to the terminal 14 is prohibited, and the prohibited state is released when the execution of the measurement processing is detected.

In the prohibited state, even if any signals are detected due to noise, etc. in the measurement device unit 22, the detection results are not employed as the measurement result, and the measurement instrument 12 and the terminal 14 displays "----" as an example.

Next, after the execution of the measurement processing is detected in Step SS10, the detection result in the measurement device unit 22 is employed as the measurement result, and the measurement result is displayed in the measurement instrument 12 and the terminal 14.

The terminal 14 receives the measurement result transmitted from the measurement instrument 12 (Step ST8) and executes the display of the measurement result, thereby displaying the measurement result in the display unit 54 (Step ST9). By doing so, the terminal 14 executes a predetermined processing on the basis of the measurement result received from the measurement instrument 12.

The measurement result includes the resistance value indicating the internal resistance of the batteries 40 acquired from the electric current value between the both probes 44 and 48 and the electric voltage value of the battery 40 acquired from the potential difference generated between the both probes 44 and 48. In addition, the measurement result includes the temperature value of the battery 40 acquired from the temperature of the both probes 44 and 48. Furthermore, the measurement result includes judgement results acquired from the resistance value, the electric voltage value, and the temperature value mentioned above, and in this embodiment, the resistance value, the electric voltage value, the temperature value, and the judgement result are transmitted to the terminal 14 as the measurement results.

By doing so, in the display unit 54 of the terminal 14, the resistance value, the electric voltage value, the temperature value, the judgement result, and so forth that are transmitted as the measurement results are displayed.

In addition, the measurement instrument 12 displays the measurement result in the display unit 24 (Step SS13), and by utilizing a storing area of the storage unit 32, adds, as an integrated value, the resistance value, the electric voltage value, and the temperature value that are measured values of the physical quantities, as the acquired measurement result, every time they are acquired (Step SS14). Next, it is judged whether or not a predetermined time set in advance has passed after the detection of the execution of the measurement processing (Step SS15), and the processing repeats from Step SS11 to Step SS14 until the predetermined time has passed. As an example, the predetermined time is set at 1600 mS (seconds).

In a specific description, as shown in FIG. 14, the display unit 24 of the measurement instrument 12 displays the measurement result displayed view 152. In the measurement result displayed view 152, "1.000 mΩ" indicating the resistance value that is the measurement result is displayed in a resistance-value field 180, and "12.00V" indicating the electric voltage value that is the measurement result is displayed in an electric-voltage-value field 182. In addition, PASS" indicating that the judgement result that is the measurement result is acceptable is displayed in a judgement result field 184.

Figure 16:
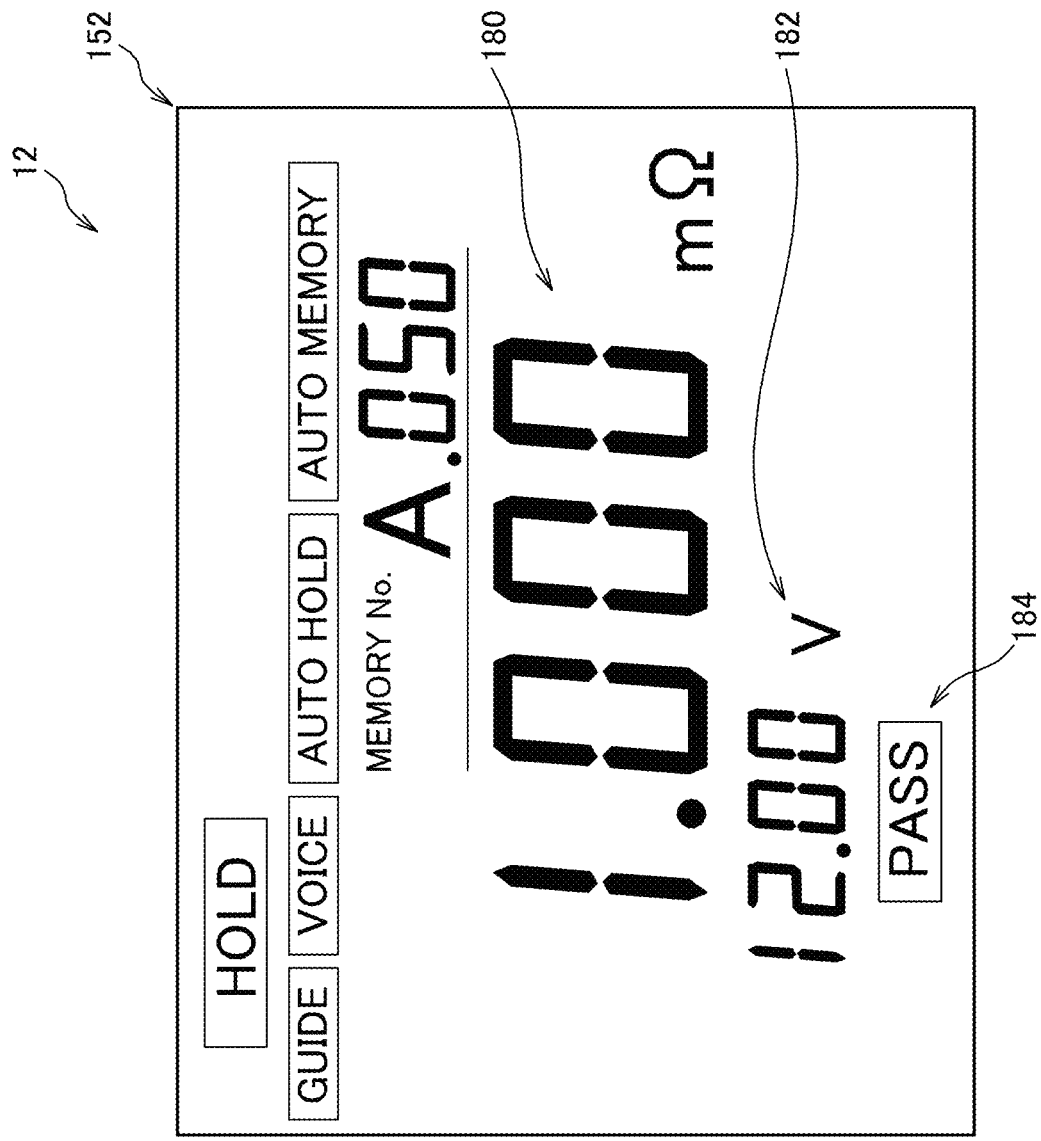
FIG. 16 is a diagram showing an example of the displayed view of the measurement result for the battery number "50" displayed on the measurement instrument.

Subsequently, FIG. 16 is a diagram showing an example of the measurement result displayed view of the battery number "50" displayed on the measurement instrument 12. As described above, the measurement instrument 12 displays the measurement results for the battery number "1" to the battery number "50" in an order.

In Step SS19 shown in FIG. 7, which will be described below, a description will be given of a case in which the measurement target number is counted up, and the measurement target number has become "50". In this case, as shown in FIG. 16, by the processing in Step SS13, "1.000 mΩ" indicating the resistance value that is the measurement result is displayed in the resistance-value field 180 in the measurement result displayed view 152, and "12.00V" indicating the electric voltage value that is the measurement result is displayed in the electric-voltage-value field 182. In addition, "PASS" indicating that the judgement result that is the measurement result is acceptable is displayed in the judgement result field 184.

Referring back to FIG. 6, when the measurement instrument 12 judges that the predetermined time has passed in Step SS15, the measurement instrument 12 acquires the save data (Step SS16). The save data is the data set on the basis of the measurement result acquired in a predetermined period after the detection of the execution of the measurement processing.

In a specific description, in the integrated value stored in the storage unit 32, the resistance values and the electric voltage values, which have been acquired eight times in the past, are integrated. By dividing the integrated value by "eight", the mean value of the resistance values and the electric voltage values acquired eight times during 1600 mS (seconds) is acquired as the save data.

The measurement instrument 12 saves the save data acquired in this way in the storage unit 32 so as to be associated with the specifying information 90 of the measurement target from which the measurement result is acquired (Step SS17). By doing so, the measurement instrument 12 saves the save data based on the measurement result of the measurement target so as to be associated with the specifying information 90 on the basis of the specifying information 90 received from the terminal 14. The specifying information 90 includes the target-group specifying information 96 and the identification data 98 of the measurement target group.

FIG. 17 is an explanatory diagram showing an example of data 190 saved in the measurement instrument 12 and shows a stored content of the area the memory number 115 of which is set "A.001" in the storage unit 32 of the measurement instrument 12.

In the area the memory number 115 of which is "A.001", profile information 192 indicating the specifying information 90 and the measurement data 194 indicating the measurement result are stored so as to be associated with each other.

"1" is stored as the profile number 91 of the profile information 192, and the character string "HIOKI 1F UPS-ROOM" is stored as the positional information 100 indicated by the room information 102 of the target-group specifying information 96 in the profile information 192.

In addition, the character string "UPS1-1" is stored as the device information 104 indicated by the category information 106 of the target-group specifying information 96 in the profile information 192, and the number "1" is stored as the battery number 108 indicated by the identification data 98 of the profile information 192.

The character string "A.001" is stored as the memory number 115 of the measurement data 194, and the memory number 115 includes, as an example, a label of a memory address set in the memory area of the storage unit 32. "2020/4/20 13:00:00" indicating the measured time is stored as date and time 196 of the measurement data 194.

"1.000" mΩ is stored as a resistance value 200 forming save data 198 in the measurement data 194, and "12.00" V is stored as an electric voltage value 202. "_._"° C. is stored as a temperature value 204 forming the save data in the measurement data 194.

An index selected from "mΩ", "V", and so forth used for the judgement of the measurement result is stored as a comparator threshold value 206 of the measurement data 194. In addition, any one text selected from "PASS" indicating an acceptable judgement, "WARNING" indicating an attention, and "FAIL" indicating an unacceptable judgement is stored as a judgement result 208 of the measurement data 194.

Next, as shown in FIG. 7, the measurement instrument 12 saves the data 190 in the storage unit 32, and thereafter, transmits the data 190 saved in the storage unit 32 to the terminal 14 (Step SS18). The data 190 includes the save data 198, and the transmission of the data 190 indicates a notification that the measurement instrument 12 has finished the saving of the data 190.

The terminal 14 to which the data 190 is transmitted judges whether or not the data 190 including the save data 198 is received (Step ST10). When it is judged that the data 190 is received, the save data 198 is displayed on the display unit 54 (Step ST11), and the measurement target number stored in the storage unit 61 for specifying the measurement target is counted up (Step ST12).

Similarly, the measurement instrument 12 counts up the measurement target number stored in the storage unit 32 (Step SS19).

Next, the measurement instrument 12 judges whether or not the data clear button is operated, for example (Step SS20), and when it is judged that the data clear button is not operated, the process is branched to Step SS24.

In addition, when the measurer operates the data clear button provided on the measurement instrument 12, it is judged that the data clear button is operated in Step SS20, and the data 190 including the save data 198 and the identification data 98 that has been saved last in the storage unit 32 is deleted (Step SS21).

Furthermore, the measurement instrument 12 counts down the measurement target number of the storage unit 32 (Step SS22) and transmits a fact that the measurement target number has been counted down to the terminal 14 (Step SS23), and thereafter, the processing proceeds to Step SS24.

In this embodiment, although a description has been given of only a function of deleting the data 190 that has been saved last in accordance with the operational input, the present invention is not limited thereto. For example, a function of skipping one measurement target to be measured next in accordance with the operational input may be provided.

On the other hand, the measurement instrument 12 judges whether or not the fact that the count down has been performed has been received (Step ST13), and when it is judged that the fact that the count down has been performed has not been received, the processing is branched to Step ST15. In addition, when it is judged that the fact that the count down has been performed has been received in Step ST13, the measurement target number of the storage unit 61 is counted down (Step ST14). Next, it is judged whether or not the measurement has been finished on the basis of whether or not the measurement target number has reached the finish number 114 indicating an end value of the battery number 108 of the specifying information 90 (Step ST15).

When it is judged that the measurement target number has reached the finish number 114 and the measurement has been finished in Step ST15, the measurement processing is terminated. In addition, when it is judged that the measurement target number has not reached the finish number 114 and the measurement has not been finished in Step ST15, the processing is branched to Step ST7, and the measurement target number is notified.

By doing so, when the deletion of the data 190 including the save data 198 and the identification data 98 that has been saved last in the storage unit 32 is carried out, the identification data 98 associated with the deleted save data 198 is notified (Step ST7).

On the other hand, when the deletion of the data 190 that has been saved last in the storage unit 32 is not carried out, the identification data 98 indicated by the measurement target number that has been counted up in Step ST12 is notified (Step ST7). By doing so, on the basis of the specifying information 90, the respective identification data 98 of the measurement target group is notified from "1" to "50" in an order.

In the above, the notification in Step ST7 is carried out as the processing proceeds to the next step when the data 190 from the measurement instrument 12 is received and the notification that the saving of the data 190 from the measurement instrument 12 is finished is received in Step ST10. By doing so, when the terminal 14 is notified of the finish of the saving from the measurement instrument 12, the terminal 14 notifies the identification data 98 that is to be notified next.

The measurement instrument 12 judges whether or not the measurement has been finished in Step SS24 on the basis of whether or not the measurement target number has reached the finish number 114 (Step SS24).

When it is judged that the measurement target number has reached the finish number 114 and the measurement has been finished in Step SS24, the processing is terminated. In addition, when it is judged that the measurement target number has not reached the finish number 114 and the measurement has not been finished in Step SS24, the processing is branched to Step SS8, and the measurement target number is notified.

By doing so, when the deletion of the data 190 including the save data 198 and the identification data 98 that has been saved last in the storage unit 32 is carried out, the identification data 98 associated with the deleted save data 198 is notified (Step SS8).

On the other hand, when the deletion of the data 190 that has been saved last in the storage unit 32 is not carried out, the identification data 98 indicated by the measurement target number that has been counted up in Step SS19 is notified (Step SS8). By doing so, on the basis of the specifying information 90, the respective identification data 98 of the measurement target group is notified from "1" to "50" in an order.

In addition, in Step SS17, the save data 198 acquired in Step SS16 is saved in the storage unit 32 so as to be associated with the specifying information 90 of the measurement target from which the measurement result has been acquired. By doing so, every time the identification data 98 of the measurement target is notified, the save data 198 is saved so as to be associated with the notified identification data 98.

(Operations and Effects)

Next, operational advantages achieved by this embodiment will be described.

The measurement system 10 in this embodiment is the measurement system 10 that includes the measurement instrument 12 and the terminal 14, the measurement instrument 12 and the terminal 14 being configured so as to be communicatable. The measurement instrument 12 is provided with: the measurement unit 62 configured to execute the measurement processing for measuring the physical quantity of the measurement target; the detection unit 70 configured to detect the execution of the measurement processing; and the transmission permission unit 72 configured to permit transmission of the measurement result to the terminal 14, the permission being triggered by detection of the execution of the measurement processing by the detection unit 70. The terminal 14 is provided with: the result reception unit 84 configured to receive the measurement result from the measurement instrument 12; and the execution unit 86 configured to execute a predetermined processing based on the measurement result received.

According to such a configuration, in the measurement instrument 12, the transmission of the measurement result to the terminal 14 is permitted by being triggered by the detection of the execution of the measurement processing.

Therefore, compared with a case in which a request command from the terminal 14 needs to be received all the time and in which the measurement result needs to be transmitted to the terminal 14 every time the request command is received, it is possible to suppress the reception processing and the transmission processing that may be caused during the measurement processing.

Therefore, it is possible to suppress the effect that may be caused on the measurement processing.

In addition, in the measurement system 10 in this embodiment, the terminal 14 is provided with the transmission unit 80, the transmission unit 80 being configured to transmit the specifying information 90 specifying the measurement target to the measurement instrument 12. The measurement instrument 12 includes: the reception unit 60 configured to receive the specifying information 90 from the terminal 14; and the saving unit 64 configured to save the save data 198 based on the measurement result acquired by measuring the physical quantity of the measurement target by the measurement unit 62 so as to be associated with the specifying information 90 based on the received specifying information 90.

According to such a configuration, it is possible to transmit the specifying information 90 for specifying the measurement target from the terminal 14 to the measurement instrument 12. Therefore, a manual input operation of the specifying information 90 for the measurement instrument 12 is no longer required. In addition, compared with a case in which the specifying information 90 is input by the measurement instrument 12 manually, it is possible to improve an operability and to suppress the operation time.

Then, it is possible to, for example, collectively register a plurality of specifying information 90 to the measurement instrument 12 before starting the measuring operation. By doing so, it is possible to reduce input error. In addition, by utilizing copy and paste function of the terminal 14, for example, it is possible to further reduce the operation time.

In addition, because the save data 198 based on the measurement result acquired by the measurement instrument 12 is saved in association with the specifying information 90, it is possible to grasp the relationship between the save data 198 and the specifying information 90 from the saved data 190.

Therefore, compared with a case in which records need to be made for every measurement such that the measurement target and the measurement result are associated with each other, the measurement operation becomes easier and a convenience thereof is improved.

In addition, the save data 198 and the specifying information 90 are saved so as to be associated with each other. Therefore, when a report is to be made after the measurement, there is no need to perform matching of the measurement result that is an example of the save data 198 and a measurement site that is an example of the specifying information 90 as a human task.

In addition, there is no need to perform checking work of the data after the measurement. Therefore, it is possible to shorten the operation time after the measurement and to prevent need of re-measurement due to matching error.

Furthermore, the operational work, which used to require two people, the measurer and a recorder, can now be performed only by the measurer. Thus, it is possible to reduce a number of people required for the measurement work.

The save data 198, etc. is saved in the measurement instrument 12. Therefore, compared with a case in which the save data 198 is transmitted and saved in the terminal 14, it is possible to prevent occurrence of erroneous saving of the data due to a communication failure and to improve the reliability.

In addition, in this embodiment, the terminal 14 further includes the generation unit 82, the generation unit 82 being configured to generate the specifying information 90. The specifying information 90 includes: the target-group specifying information 96 for specifying the measurement target group having the plurality of measurement targets; and the management information 110 for specifying the plurality of identification data 98 for managing each target in the measurement target group. The saving unit 64 is configured to associate the respective save data 198 of the measurement target group acquired by the measurement unit 62 with the identification data 98 and the target-group specifying information 96 based on the specifying information 90.

According to such a configuration, in the measurement instrument 12, compared with a case in which the target-group specifying information 96 for specifying the measurement target group and the identification data 98 for managing each target in the measurement target group are input manually, it is possible to omit complicated input operation in the measurement instrument 12.

Furthermore, in this embodiment, the target-group specifying information 96 includes at least one of the category information 106 indicating the category of the measurement target group and the room information 102 for specifying the room accommodating the measurement target group.

According to such a configuration, by utilizing the category information 106 or the room information 102 contained in the saved data 190, a work of making the report after the measurement is made easier.

In addition, in this embodiment, the measurement instrument 12 is further provided with the notifying unit 66, the notifying unit 66 being configured to notify the identification data 98 of each target in the measurement target group in an order based on the specifying information 90. The saving unit 64 is configured to save, every time the notifying unit 66 notifies the identification data 98 of the measurement target, the save data 198 so as to be associated with the identification data 98 notified.

According to such a configuration, it is possible to guide the measurement target to the measurer on the basis of the specifying information 90 set in the measurement instrument 12.

Therefore, the measurer does not need to check documents containing a description of the measurement target during the measurement. Thus, it is possible to suppress erroneous measurement and to shorten the operation time required for the measurement.

Especially, when there are many measurement targets, it is possible to suppress the erroneous measurement such as measuring the measurement target by skipping one of the targes and measuring the same measurement target twice.

In addition, the notification of the identification data 98 is performed by the measurement instrument 12. Therefore, even in a case in which the wireless communication instrument such as the smartphone that is formed of an apparatus separate from the measurement instrument 12 cannot be brought into the measurement site, it is possible to perform the notification by the measurement instrument 12 alone.

Furthermore, in this embodiment, the measurement instrument 12 transmits the identification data 98 to the terminal 14, the identification data 98 being notified next by the notifying unit 66, and the terminal 14 receives the identification data 98 from the measurement instrument 12, and in turn, notifies the identification data 98 received.

According to such a configuration, it is possible to guide the measurement target to the measurer from the terminal 14.

In addition, in this embodiment, when the saving processing by the saving unit 64 is finished, the measurement instrument 12 notifies that the saving has been finished to the terminal 14, and when it is notified that the saving has been finished from the measurement instrument 12, the terminal 14 notifies the identification data 98 that is to be notified next.

According to such a configuration, after the saving processing has been finished in the measurement instrument 12, the identification data 98 that is to be notified next is notified. By doing so, compared with a case in which the identification data 98 that is to be notified next is notified when the measurer finished the measurement of the measurement target, it is possible to save the date with reliability and to improve shortening of the measurement time.

In addition, in this embodiment, the terminal 14 is configured so as to be able to be carried by the measurer, the terminal 14 being configured to notify the identification data 98 of the measurement target with a sound.

According to such a configuration, compared with a case in which the identification data 98 of the measurement target is notified with a display, the measurer can concentrate on the measurement operation by keeping eye on the measurement part. Thus, it is possible to suppress the erroneous measurement and to shorten the operation time required for the measurement.

In addition, the notification of the identification data 98 with the sound is performed by the terminal 14 that can be carried by the measurer. Therefore, by placing, for example, the terminal 14 in a breast pocket that is closer to the ear than the measurement instrument 12, it is possible to suppress mishearing of the identification data 98. Especially, by utilizing the terminal 14 having a sound level adjusting function, it is possible to further suppress mishearing of the identification data 98.

In addition, in this embodiment, the measurement instrument 12 is provided with the deleting unit 68 configured to delete the save data 198 and the identification data 98 that have been saved last by the saving unit 64 in accordance with the operational input by the measurer.

According to such a configuration, when the measurement is made on a wrong measurement target, the save data 198 and the identification data 98 that have been saved last can be deleted by the operational input by the measurer. In addition, by repetitively performing the operational input, it is possible to return to a measurement start state.

Thus, compared with a case in which the measurement needs to be restarted from the first measurement target when the erroneous measurement is occurred, a convenience is improved.

This operational input is performed by the measurement instrument 12. Here, the measurer may ware gloves in order to prevent electrical shock, it is convenient to perform the operational input by using rubber keys, for example, provided on the measurement instrument 12 rather than performing the operation on a mobile terminal, such as the smartphone, or the personal computer. In addition, compared with a case in which the operational input is performed with the mobile terminal, such as the smartphone, or the personal computer, a time required to take off the gloves is not required any more, and the measurement time can be shortened.

In addition, in this embodiment, when the deletion is performed by the deleting unit 68, the notifying unit 66 notifies the identification data 98 associated with the save data 198 deleted.

According to such a configuration, when the save data 198 and the identification data 98 that have been saved last are deleted, the identification data 98 associated with the deleted save data 198 is notified. By doing so, it is possible to suppress mistakes in the measurement target.

In addition, in this embodiment, the specifying information 90 is stored in the plurality of areas allocated in the memory of the measurement instrument 12 and the plurality of identification data 98 specified by the management information 110 and the memory identification data 116 for specifying the respective areas are associated in a one-to-one fashion.

According to such a configuration, it is possible to obtain the identification data 98 specified by the management information 110 from the area indicated by the memory identification data 116.

In addition, in this embodiment, the save data 198 is set based on the measurement result obtained during the predetermined period after the execution of the measurement processing is detected by the detection unit 70.

According to such a configuration, compared with a case in which the measured value is set as the save data 198, it is possible to save the save data 198 in which effects of the noise, etc. imparted to the measured value is suppressed.

Although the embodiment of the present invention has been described in the above, the above-mentioned embodiment merely illustrates a part of application examples of the present invention, and the technical scope of the present invention is not intended to be limited to the specific configurations of the above-described embodiment.

The present application claims a priority based on Japanese Patent Application No. 2020-195989 filed on Nov. 26, 2020 in the Japan Patent Office and Japanese Patent Application No. 2020-195993 Nov. 26, 2020 in the Japan Patent Office, the entire contents of which are incorporated herein by reference.

DESCRIPTION OF THE REFERENCE NUMERALS 10 measurement system
12 measurement instrument
14 terminal
20 controller unit
38 uninterruptible power supply
40 battery
50 controller unit
60 reception unit
62 measurement unit
64 saving unit
66 notifying unit 68 deleting unit
70 detection unit
72 transmission permission unit
80 transmission unit
82 generation unit
84 result reception unit
86 execution unit
90 specifying information
96 target-group specifying information
98 identification data
100 positional information
102 room information
106 category information
108 battery number
110 management information
112 starting number
114 finish number
116 memory identification data

What is claimed is:

1. A measurement system comprising a measurement instrument and a terminal, the measurement instrument and the terminal being configured so as to perform communication between the measurement instrument and the terminal, wherein the measurement instrument is a battery tester provided with:
   a measurement device circuit having a positive electrode probe and a negative electrode probe, the measurement device circuit applying a detection AC signal between the positive electrode probe and the negative electrode probe, and detecting whether or not an AC current is flowing between the positive electrode probe and the negative electrode probe in a manner corresponding to the detection AC signal;
   a measurement circuit executing a measurement processing for measuring a physical quantity of a measurement target when the positive electrode probe is connected to a positive terminal of the measurement target and the negative electrode probe is connected to a negative terminal of the measurement target, wherein the measurement target is a battery;
   a detection circuit detecting execution of the measurement processing by determining that the measurement processing has been executed when the measurement device circuit detects that the AC current is flowing between the positive electrode probe and the negative electrode probe; and
   a transmission permission circuit permitting transmission of a measurement result associated with the measurement processing to the terminal, the permission of the transmission being triggered by detection of the execution of the measurement processing by the detection circuit, and
   the terminal is provided with:
      a result reception circuit receiving the measurement result from the measurement instrument; and
      an execution circuit executing a predetermined processing based on the received measurement result.

2. The measurement system according to claim 1, wherein the terminal is provided with a transmission circuit, the transmission circuit transmitting specifying information specifying the measurement target to the measurement instrument,
the measurement instrument is provided with:
   a reception circuit receiving the specifying information from the terminal; and
   a saving circuit saving a save data based on the measurement result acquired by measuring the physical quantity of the measurement target by the measurement circuit so as to be associated with the specifying information based on the specifying information being received.

3. The measurement system according to claim 2, wherein the measurement target includes a plurality of measurement targets,
the terminal is further provided with a generation circuit, the generation circuit generating the specifying information,
the specifying information includes:
   target-group information for specifying a measurement target group having the plurality of the measurement targets; and
   management information for specifying a plurality of identification data for managing each target in the measurement target group, and
the saving circuit associating first data of the save data of each target in the measurement target group acquired by the measurement circuit, with second data of the identification data and the target-group information based on the received specifying information.

4. The measurement system according to claim 3, wherein the target-group information includes at least one of a category information indicating a category of the measurement target group and room information for specifying a room for accommodating the measurement target group.

5. The measurement system according to claim 3, wherein the measurement instrument is further provided with a notifying circuit, the notifying circuit notifying the second data of the identification data of each target in the measurement target group in an order based on the received specifying information, and
the saving circuit saves, every time the notifying circuit notifies the identification data of the measurement targets, the save data so as to be associated with the notified identification data.

6. The measurement system according to claim 5, wherein the measurement instrument is configured to transmit the identification data to the terminal, the identification data being notified next by the notifying circuit, and
the terminal is configured to receive the identification data from the measurement instrument, and in turn, notifies the received identification data.

7. The measurement system according to claim 5, wherein when saving processing by the saving circuit is finished, the measurement instrument is configured to notify that the saving has been finished to the terminal, and
when it is notified that the saving has been finished by the measurement instrument, the terminal notifies the identification data that is to be notified next.

8. The measurement system according to claim 5, wherein the terminal is configured so as to be able to be carried by a measurer, the terminal being configured to notify the identification data of the measurement target with a sound.

9. The measurement system according to claim 5, wherein the measurement instrument is provided with a deleting circuit, the deleting circuit deleting the save data and the identification data that have been saved last by the saving circuit in accordance with an operational input by a measurer.

10. The measurement system according to claim 9, wherein when the deletion is performed by the deleting circuit, the notifying circuit notifying the that the identification data associated with the save data is deleted.

11. The measurement system according to claim 3, wherein
the specifying information is stored in a plurality of areas allocated to a memory of the measurement instrument, and
the plurality of identification data specified by the management information and memory identification data for specifying the respective areas are associated in a one-to-one fashion.

12. The measurement system according to claim 2, wherein
the save data is set based on the measurement result obtained during a predetermined period after the execution of the measurement processing is detected by the detection circuit.

13. A measurement instrument connected to a terminal to perform communication between the measurement instrument and the terminal, the measurement instrument comprising:
a measurement device circuit having a positive electrode probe and a negative electrode probe, the measurement device circuit applying a detection AC signal between the positive electrode probe and the negative electrode probe, and detecting whether or not an AC current is flowing between the positive electrode probe and the negative electrode probe in a manner corresponding to the detection AC signal;
a measurement circuit executing a measurement processing for measuring a physical quantity of a measurement target when the positive electrode probe is connected to a positive terminal of the measurement target and the negative electrode probe is connected to a negative terminal of the measurement target, wherein the measurement target is a battery;
a detection circuit detecting execution of the measurement processing by determining that the measurement processing has been executed when the measurement device circuit detects that the AC current is flowing between the positive electrode probe and the negative electrode probe; and
a transmission permission circuit permitting transmission of a measurement result associated with the measurement processing to the terminal, the permission of the transmission being triggered by detection of the execution of the measurement processing by the detection circuit,
wherein the measurement instrument is a battery tester.

14. A terminal connected to a measurement instrument to perform communication between the measurement instrument and the terminal, the terminal comprising:
a result reception circuit receiving a measurement result transmitted by the measurement instrument in a transmission, the transmission being triggered by detection of execution of measurement processing of a battery; and
an execution circuit executing a predetermined processing based on the received measurement result,
wherein the measurement instrument is a battery tester,
wherein the measurement instrument is provided with:
a measurement device circuit having a positive electrode probe and a negative electrode probe, the measurement device circuit applying a detection AC signal between the positive electrode probe and the negative electrode probe, and detecting whether or not an AC current is flowing between the positive electrode probe and the negative electrode probe in a manner corresponding to the detection AC signal;
a measurement circuit executing a measurement processing for measuring a physical quantity of a measurement target when the positive electrode probe is connected to a positive terminal of the measurement target and the negative electrode probe is connected to a negative terminal of the measurement target;
a detection circuit detecting execution of the measurement processing by determining that the measurement processing has been executed when the measurement device circuit detects that the AC current is flowing between the positive electrode probe and the negative electrode probe;
a transmission permission circuit permitting transmission of a measurement result associated with the measurement processing to the terminal, the permission of the transmission being triggered by detection of the execution of the measurement processing by the detection circuit.

15. A non-transitory computer readable storage medium in which a program is recorded, wherein a computer of a terminal is connected to a measurement instrument to perform communication between the measurement instrument and the terminal, the program causing the computer to execute:
reception procedure for receiving a measurement result transmitted by the measurement instrument in a transmission, the transmission being triggered by detection of execution of measurement processing of a battery; and
execution procedure for executing a predetermined processing based on the received measurement result,
wherein the measurement instrument is a battery tester,
further wherein the measurement instrument includes:
a measurement device circuit having a positive electrode probe and a negative electrode probe, the measurement device circuit applying a detection AC signal between the positive electrode probe and the negative electrode probe, and detecting whether or not an AC current is flowing between the positive electrode probe and the negative electrode probe in a manner corresponding to the detection AC signal;
a measurement circuit executing a measurement processing for measuring a physical quantity of a measurement target when the positive electrode probe is connected to a positive terminal of the measurement target and the negative electrode probe is connected to a negative terminal of the measurement target;
a detection circuit detecting execution of the measurement processing by determining that the measurement processing has been executed when the measurement device circuit detects that the AC current is flowing between the positive electrode probe and the negative electrode probe; and
a transmission permission circuit permitting transmission of a measurement result associated with the measurement processing to the terminal, the permission of the transmission being triggered by detection of the execution of the measurement processing by the detection circuit.

16. The measurement system according to claim 1, wherein the transmission permission circuit is to:
place the measurement instrument in a prohibited state when the detection circuit does not detect the execution of the measurement processing, wherein in the prohibited state the measurement instrument is prohibited from sending a transmission to the terminal; and release the prohibited state when the detection circuit detects the execution of the measurement processing.

17. The measurement instrument according to claim 13, wherein the transmission permission circuit is to:

place the measurement instrument in a prohibited state when the detection circuit does not detect the execution of the measurement processing, wherein in the prohibited state the measurement instrument is prohibited from sending a transmission to the terminal; and release the prohibited state when the detection circuit detects the execution of the measurement processing.

18. The terminal according to claim 14, wherein the measurement instrument is to:

place the measurement instrument in a prohibited state when the execution of the measurement processing is not detected, wherein in the prohibited state the measurement instrument is prohibited from sending a transmission to the terminal; and release the prohibited state when the execution of the measurement processing is detected.

19. The non-transitory computer readable storage medium of claim 15, wherein the measurement instrument is to:

place the measurement instrument in a prohibited state when the execution of the measurement processing is not detected, wherein in the prohibited state the measurement instrument is prohibited from sending a transmission to the terminal; and release the prohibited state when the execution of the measurement processing is detected.

* * * * *